United States Patent [19]

Izumi et al.

[11] Patent Number: 5,528,399
[45] Date of Patent: Jun. 18, 1996

[54] OPTICAL ADDRESS TYPE DISPLAY DEVICE WITH UNIFORMLY FUNCTIONING OPTICAL SWITCHING ELEMENTS EACH PROVIDED FOR EACH PIXEL

[75] Inventors: Yoshihiro Izumi, Kashihara; Sayuri Fujiwara, Nara, both of Japan

[73] Assignee: Sharp Kabushiki Kaisha, Osaka, Japan

[21] Appl. No.: 146,487

[22] Filed: Oct. 29, 1993

[30] Foreign Application Priority Data

Oct. 29, 1992 [JP] Japan .................................. 4-291806
Jan. 18, 1993 [JP] Japan .................................. 5-012929
Apr. 12, 1993 [JP] Japan .................................. 5-084611

[51] Int. Cl.$^6$ ............................................ G02F 1/135
[52] U.S. Cl. .................... 359/72; 359/54; 385/901
[58] Field of Search ........................ 359/42, 48, 49,
359/50, 72, 54; 385/14, 16, 17, 18, 24,
31, 901, 129, 132, 131, 2, 3

[56] References Cited

U.S. PATENT DOCUMENTS

| | | | |
|---|---|---|---|
| 3,838,908 | 10/1974 | Channin | 359/54 |
| 4,915,486 | 4/1990 | Hansen | 359/36 |
| 4,952,031 | 8/1990 | Tsunoda et al. | 359/72 |
| 4,974,942 | 12/1990 | Gross et al. | 359/54 |
| 5,009,483 | 4/1991 | Rockwell, III | 385/2 |
| 5,170,448 | 12/1992 | Ackley et al. | 385/131 |
| 5,307,186 | 4/1994 | Izumi et al. | 359/42 |

FOREIGN PATENT DOCUMENTS

| | | |
|---|---|---|
| 0490484A3 | 6/1992 | European Pat. Off. . |
| 4114629A1 | 5/1992 | Germany . |
| 63-253903 | 10/1988 | Japan . |
| 1173016 | 7/1989 | Japan . |
| 1224727 | 9/1989 | Japan . |
| 2089029 | 3/1990 | Japan . |
| 2134617 | 5/1990 | Japan . |
| 511268 | 1/1993 | Japan . |

OTHER PUBLICATIONS

Patent Abstracts of Japan, vol. 5, No. 100 (p–068) and JP–A–56 043 609 (NTT), Apr. 22, 1981.

Primary Examiner—William L. Sikes
Assistant Examiner—Kenneth Parker
Attorney, Agent, or Firm—David G. Conlin; John L. Welch; Brian L. Michaelis

[57] ABSTRACT

A display device has an insulated basic substrate. A plurality of light waveguides are arranged on the basic substrate in parallel to each other. A plurality of signal wires is arranged in parallel and in a manner to be crossed with the light waveguides, respectively. A plurality of photoconductive layers three-dimensionally are laid between the light waveguides and the signal wires and directly connected with each light guiding portion of the light waveguides at respective crosspoints between the light waveguides and the signal electrodes. A plurality of pixel electrodes provided are to be connected with the photoconductive layers, respectively. An insulated opposed substrate located in opposition to the basic substrate with a display medium therebetween and having an opposed electrode on the surface opposed to the basic substrate. And the relation among an index of refraction $n_1$ of the light guiding portion, an index of refraction $n_2$ of the photoconductive layer, and an angle of incidence $\theta$ of light given from the light guiding portion to the photoconductive layer meeting the following expression of $$n_1 \sin \theta < n_2 \qquad (1)$$

6 Claims, 26 Drawing Sheets

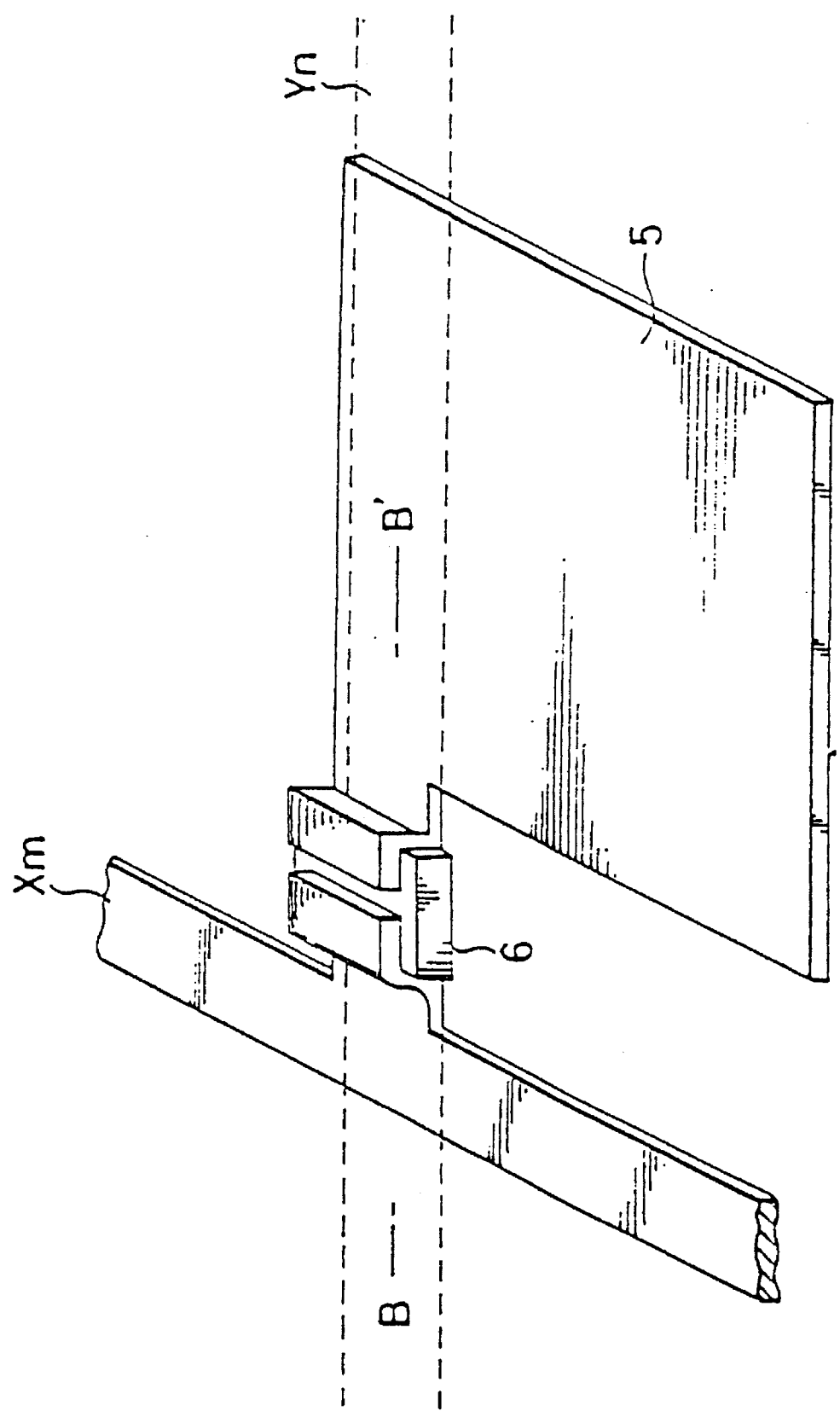

WINDOW FORM OF CLAD LAYER
VIEWED FROM THE TOP

WINDOW FORM OF CLAD LAYER
VIEWED FROM THE TOP

WINDOW FORM OF CLAD LAYER VIEWED FROM THE TOP (LIGHT WAVE GUIDE)

WINDOW FORM OF CLAD LAYER VIEWED FROM THE TOP (LIGHT WAVE GUIDE)

WINDOW FORM OF CLAD LAYER
VIEWED FROM THE TOP (LIGHT WAVE GUIDE)

WINDOW FORM OF CLAD LAYER
VIEWED FROM THE TOP (LIGHT WAVE GUIDE)

OPTICAL ADDRESS TYPE DISPLAY DEVICE WITH UNIFORMLY FUNCTIONING OPTICAL SWITCHING ELEMENTS EACH PROVIDED FOR EACH PIXEL

BACKGROUND OF THE INVENTION

1. Field of the Invention

The present invention relates to an optical address type display device which may be used as a display in the field of AV equipment such as a TV or a video game or OA equipment such as a personal computer or a wordprocessor.

2. Description of the Related Art

In recent years, a matrix type liquid crystal display device (LCD) has been requested to make its capacitance larger and larger. That is, with increase of resolution of a display device, the number of pixels has been requested to increase from 400×600 to 1000×1000 or more. The size of the display screen has been also requested to increase from 10 to 20 inches or more. In an active-matrix driving type LCD, in particular, a thin film transistor (TFT) driving type LCD, however, there may be brought about a problem that the increase of scan lines leads to the increase of wire resistance and a delay of a signal waveform may be caused by the wire resistance and the floating capacitance or a problem that a voltage ratio of selected pixels to non-selected pixels cannot be obtained if the number of scan lines is larger than a threshold value in the simple-matrix driving type LCD. To solve these problems, there has been proposed a liquid crystal display device with a high resolution which is capable of easily increasing pixel driving current through the effect of a light switching function. (Toyo Rayon, Ltd.: Japanese Patent Lying Open No. Hei1-173016, Casio Calculator, Ltd.: Japanese Patent Lying Open No. Hei1-224727, Matushita Electronic Industry, Ltd.: Japanese Patent Lying Open No, Hei2-89029, Seiko-Epson, Ltd.: Japanese Patent Lying Open No. Hei2-134617, Sharp, Ltd.,: Japanese Patent Lying Open No. Hei3-263647, etc.)

Later, the description will be oriented to a method for driving an active-matrix driving type liquid crystal display device which is one kind of an optical address type liquid crystal display device (optical scan type liquid crystal display device) as referring to the drawings.

FIGS. 24 and 25 show an optical address type active-matrix driving type liquid crystal display device as disclosed in the Japanese Patent Application No. Hei5-100246 filed by the applicant of the present application.

In this display device, a basic substrate 21 composing a display panel includes a plurality of light waveguides $Y_1$, $Y_2$, ..., $Y_n$ arranged vertically on a glass substrate 21a. A clad layer 23 is formed on the glass substrate 21a in a manner to cover these light waveguides $Y_1$, $Y_2$, ..., $Y_n$. Signal wires $X_1$, $X_2$, ..., $X_m$ are arranged horizontally in a manner to be crossed with the light waveguides $Y_1$, $Y_2$, ..., $Y_n$. A pixel electrode is formed in a manner to be substantially buried in each of the areas defined by the light waveguides $Y_1$, $Y_2$, ..., $Y_n$ and the signal wires $X_1$, $X_2$, ..., $X_m$. Light switching elements 26, 26, ... each made of a photoconductive film are provided vertically between an extended portion of the pixel electrode 25 and the signal wires $X_1$, $X_2$, ..., $X_m$. Inside of the glass substrate 21a, a light cut-off layer 28a is provided in a manner to correspond to each of the light switching elements 26, 26, .... This light cut-off layer 28a serves to prevent light (outer light) from the outer surface of the glass substrate 21a from being incident to the light switching element 26.

On the opposed surface of the opposed substrate 22, there is formed an opposed electrode 29 made of a transparent conductive film. On the opposed surface of the opposed electrode 29, a light cut-off layer 29b is provided at the location corresponding to the light switching element 26 and serves to prevent light (outer light) from the outer surface of the opposed substrate 22 from being incident to the light switching element 26. On the inside of each of the glass substrates 21a and 22a, an orientation film 27a or 27b is formed and is subject to an orientating treatment. The substrates 21 and 22 formed as described above are pasted with each other through a seal 32 and a display medium 33 laid therebetween.

In such an optical display type display device, when a ray of light is applied from a luminous element array 30 to each light switching element 26 through a micro lens array 31, light waveguides $Y_1$, $Y_2$, ..., $Y_n$, the light switching element 26 lowers its impedance so as to allow a signal voltage to be applied to the light switching element 26, thereby electrically connecting the signal wires $X_1$, $X_2$, ..., $X_m$ with the pixel electrode 25. When no light is applied to the light switching element 26, the light switching element 28 enhances its impedance. This results in electrically insulating the signal wires $X_1$, $X_2$, ... $X_m$ from the pixel electrode 25. That is, this optical address type display device is arranged to use a scan signal as a light signal and is driven by using the change of impedance of the light switching element 26.

FIGS. 26 and 27 show a positional relation among the light switching element 26, one light waveguide (for example, $Y_n$), one signal wire (for example, $X_m$) and a pixel electrode 25, on which the detailed explanation about it will be expanded.

This display apparatus uses a method for picking up light from light scattering portions 24, 24 ... by forming flaws which are located on the part of the light waveguide $Y_1$, $Y_2$, ..., $Y_n$ corresponding to the light switching elements 26 for supplying a ray of light from the light waveguide $Y_1$, $Y_2$, ..., $Y_n$ to light switching elements 26, ... effectively.

The part of the ray of light propagating through the light waveguides $Y_1$, $Y_2$, ..., $Y_n$ are scattered at these light scattering portions and are emitted to the light switching elements 26 as a signal light.

In order to implement a high-density representation in the optical address type display device, it is necessary to provide a lot of light scattering portions 24 in one light waveguide. For example, in a high-definition TV (HDTV), 1000 or more signal wires $X_1$, $X_2$, ... $X_m$ are required. 1000 to 5000 light switching elements 26 and light scattering portions 24 are required for one of the light waveguides $Y_1$, $Y_2$, ..., $Y_n$. However, the increase of the light switching elements 26 and the light scattering portions 24 in number brings about the following problem indicated below.

FIG. 28 shows a relation between quantity of light coming out of an end of the light waveguide and the number of the light scattering portions 24 on the light waveguide in the case that the light scattering portions 24 provided in all the light waveguides are the same with each other in size and form and a ray of light applies from the other end of the light waveguide. As will be understood from this figure, the quantity of light passed through the light waveguide and picked up out of the end of the light waveguide is attenuated exponentially as the light scattering portions are increased in number. The attenuation not proportional to the number but exponentially indicates that the quantity of picked light is different at each location. That is, the quantity of light picked up at each location is made smaller as the location goes further along the light waveguide from the light-incident side. In this prior art, since the light scattering portions 24 are the same in size, the signal light is attenuated while it is propagating through the light waveguide. As the light scattering portion 24 goes further from the light-incident side, the quantity of light picked up at the portion 24 is progressively made smaller. FIG. 29 shows a V groove of each light pick-up portion 24 and a light-applied state at the light pick-up portion 24 in the prior art.

In order to obtain even display performance on the screen of the display device, it is necessary to give even performance to all the light switching elements 26. For this purpose, the same quantity of light is required to be picked up at each light scattering portion 24. Hence, it is necessary to improve exponential attenuation of the quantity of picked-up light along the light waveguide.

As described above, such a display device as impairing a light waveguide for forming a V groove as means for picking up light or such a display device as making the surface of the light waveguide coarse as disclosed in the Japanese Patent Lying Open No. Hei 1-224727 is required to mechanically or chemically work the light waveguide. However, the mechanical work may often impair a glass substrate. To prevent the impair, a high-level working technique is required. As stated above, in the case of forming a lot of light scattering portions, the working accuracy may be insufficient. As the chemical work, a wet etching technique with a hydrogen fluoride etchant is used. In this case, the etching technique has difficulty in controlling the form and the size of the light pick-up portion. This results in making the reproducibility worse. To provide the light pick-up portion, a method for impairing the light waveguide or making the surface coarse may be provided. This method makes it impossible to apply 100% of the scattered light obtained from the light pick-up portion to the switching element, thereby making the light utilization efficiency worse.

FIG. 16 is a plan view showing a structure of an optical address type active-matrix driving type LCD. FIG. 17 is a section cut on the A—A line of FIG. 16. In the plan view shown in FIG. 16, a glass substrate 105$b$, a light cut-off layer 110, an orientation film 109$b$, a transparent electrode 106, a seal 107, and a liquid crystal layer 108 are not shown though they are shown on the section shown in FIG. 17.

As shown in FIGS. 16 and 17, on one glass substrate 105$a$, a plurality of linear luminous sources $Y_1$, $Y_2$, ..., $Y_{n-1}$, $Y_n$ are ranged in the Y direction. On these linear luminous sources, a plurality of linear electrodes $X_1$, $X_2$, ..., $X_{m-1}$, $X_m$ are ranged in the X direction and in a manner to be crossed with the linear luminous sources, respectively.

Each of the linear luminous sources $Y_1$, $Y_2$, ..., $Y_{n-1}$, $Y_n$, for example, the linear luminous source $Y_2$, is composed of a luminous portion 101 formed of an LD or an LED array element and a linear waveguide 102 for transmitting a ray of light from the luminous portion 101, and a light pick-up portion 116 formed on the linear light waveguide 102. By operating the luminous portion 101, the light is propagated through the linear light waveguide 102 and is applied to the upper part of the substrate through the effect of the light pick-up portion 116.

At each of the crosspoints between the linear luminous sources $Y_1$, $Y_2$, ..., $Y_{n-1}$, Y and the linear electrodes $X_1$, $X_2$, ..., $X_{m-1}$, $X_m$, that is, on the light pick-up portion 116 of each of the linear luminous sources $Y_1$, $Y_2$, ..., $Y_{n-1}$, $Y_n$, there is provided a light switching element 103 made of a photoconductive layer. The linear electrodes $X_1$, $X_2$, ..., $X_{m-1}$, $X_m$ are formed on the same side as the pixel electrode for driving a display medium, that is, liquid crystal. The light switching elements 103 are provided between the linear electrodes $X_1$, $X_2$, ..., $X_{m-1}$, $X_m$ and the linear luminous sources $Y_1$, $Y_2$, ..., $Y_{n-1}$, $Y_n$, respectively.

On the other glass substrate 105$b$, a transparent electrode 106 is formed. The liquid crystal layer 108 is sealed between the substrate and the sealing member 107.

When a ray of light is applied to the light switching element 103, that is, the linear luminous source $Y_2$ is made operative, the light switching element 103 lowers its impedance so that a signal from the linear electrode $X_1$ may be applied to the pixel electrode 104 for changing an orientating state of liquid crystal.

By operating the linear luminous sources $Y_1$, $Y_2$, ..., $Y_{n-1}$, $Y_n$ sequentially from $Y_1$ to $Y_n$ for optical scan, an electric signal may be correspondingly applied to the linear electrodes $X_1$, $X_2$, ..., $X_{m-1}$, $X_m$. While the linear luminous sources $Y_1$, $Y_2$, ..., $Y_{n-1}$, $Y_n$ are made luminous, the light switching element on the linear luminous source is switched on. Hence, the electric signals from the linear electrodes $X_1$, $X_2$, ..., $X_{m-1}$, $X_m$ may be applied to the pixel electrodes 104, respectively. That is, in place of an electric gate signal of a TFT film, the light signals from the linear luminous sources $Y_1$, $Y_2$, ..., $Y_{n-1}$, $Y_n$ serve to scan the light switching element 103.

In the optical scan type liquid crystal display element, a technique for forming a light waveguide and a method for picking up light are important to controlling light for switching the liquid crystal. As the technique for forming a light waveguide, there has been proposed a method for melting an optical fiber on the glass substrate for forming a highly reliable and low-loss light waveguide (Sharp, Ltd.: Japanese Patent Application No. Hei4-4739)

As a method for picking up light, there have been proposed a method for picking up light scattered by a flaw on the light waveguide (Casio Calculator, Ltd.: Japanese Lying Open No. Hei1-224727, etc.).

However, a method for scattering light with a flaw has difficulty in controlling quantity of picked light when working the element. This is a disadvantage.

SUMMARY OF THE INVENTION

A first object of the present invention is to improve a method for picking up light from a light waveguide to a light switching element and keep the quantity of picked light equal at all the pick-up location for realizing an even display characteristic over all the display.

A second object of the present invention is to provide a display device which may be arranged to pick up light from a light waveguide without through the effect of mechanical work or chemical work, efficiently guide the light to the light switching element, keep the quantity of picked-up light equal at each location of picking up light, and realize an even display characteristic on the overall surface of the display.

A third object of the present invention is to provide a large-capacitance and high-resolution optical scan type liquid crystal display element.

The first object of the invention can be achieved by a display device comprising an insulated basic substrate, a plurality of light waveguides ranged on the basic substrate in parallel, a plurality of signal wires arranged in parallel and in a manner to be crossed with the light waveguides, respectively, a plurality of photoconductive layers three-dimensionally laid between the light waveguides and the signal wires at respective crosspoints between the light waveguides and the signal wires and for performing a switching operation in response to light sent from the light waveguides, a plurality of pixel electrodes provided in a manner to contact with the photoconductive layers and the light waveguides, an insulated opposed substrate located as opposed to the basic substrate with a display medium laid between the substrates and having an opposed electrode on the surface opposed to the basic substrate, light pick-up grooves provided at the corresponding locations to the photoconductive layers on the light waveguides and for guiding light transmitted through the light waveguides to the photoconductive layers, and the size of each of the grooves being increased progressively along a transmission path of each of the light waveguide.

The light pick-up groove may be V-formed.

Some light pick-up grooves arranged along and adjacent to the light waveguide are assumed as one combination and the sizes of the light pick-up grooves are respective in the combinations of the grooves.

The changing range of the light pick-up grooves is preferably 2 or more and 0.1 n or less for n light pick-up grooves provided on one light waveguide.

The second object of the invention can be achieved by a display device comprising an insulated basic substrate, a plurality of light waveguides ranged on the basic substrate and in parallel to each other, a plurality of signal wires arranged in parallel and in a manner to be crossed with the light waveguides, respectively, a plurality of photoconductive layers three-dimensionally laid between the light waveguides and the signal wires and directly connected with each light guiding portion of the light waveguides at respective crosspoints between the light waveguides and the signal electrodes and for performing a switching operation in response to a light signal from the light guiding portion, a plurality of pixel electrodes provided to be connected with the photoconductive layers, respectively, an insulated opposed substrate located in opposition to the basic substrate with a display medium therebetween and having an opposed electrode on the surface opposed to the basic substrate, and the relation among an index of refraction $n_1$ of the light guiding portion, an index of refraction $n_2$ of the photoconductive layer, and an angle of incidence $\theta$ of light given from the light guiding portion to the photoconductive layer meeting the following expression of $$n_1 \sin \theta < n_2 \quad (1)$$

Preferably, an area on the interface between the light guiding portion and the photoconductive layer is increased along a transmission path of the light waveguide.

A middle layer is provided on the interface between the light guiding portion and the photoconductive layer and the relation among an index of refraction $n_1$ of the light waveguide, an index of refraction $n_2$ of the photoconductive layer, an index of refraction $n_3$ of the middle layer, and an angle of incidence $\theta_1$ of light given from the light guiding portion to the middle layer meets the following expression (2) of $$n_1 \sin \theta_1 < n_2 \text{ and } n_1 \sin \theta_1 < n_3 \quad (2)$$

Preferably, an area of the interface between the light guiding portion and the middle layer is increased progressively along a transmission path of the light guiding portion.

Preferably, the middle layer is made of a transparent conductive material.

Preferably, the display medium is made of liquid crystal.

The third object of the invention can be achieved by a light pick-up portion having a high index of refraction formed in the clad layer formed on the top of the light waveguide through the effect of an ion exchange method. The light pick-up portion is located on the part of the light waveguide corresponding to the light switching portion.

The method for exchanging ions, that is, as one of the methods for patterning a portion having a high index of refraction on the glass substrate with accuracy, is a method for forming a portion with a high index of refraction by replacing sodium ion (Na+) of soda glass with a monovalent metal ion. Such a monovalent metal ion is silver ion (Ag+) or thallium ion (Tl+). The change volume ($\Delta_n$) of an index of refraction is $\Delta_n = 2$ to $8 \times 10^{-2}$ in Ag+ and $\Delta_n \geq 0.1$ in Tl+ (NISHIHARA Gai: "Optical Integrated Circuit" edited by Ohm edition).

In the optical address type display device according to the first aspect of the invention, each form of the plural light pick-up grooves provided on the light waveguide is made larger along the transmission path so that the transmitted light may be strongly scattered. This compensates for attenuation of the quantity of picked-up light along the transmission path, thereby being able to keep the quantity of picked-up light at any light pick-up location on the light waveguide. This results in realizing an even light application on the light switching element at each location.

In the optical address type display device according to the second aspect of the invention, since the index of refraction defines the light waveguide and the photoconductive layer made of a material meeting the above-mentioned expression, the ray of light may be efficiently guided from the light waveguide to the photoconductive layer.

In the optical address type display device according to the third aspect of the invention, when a ray of light is applied from a linear luminous source, the photoconductive layer lowers its impedance so as to enter an on state. As a result, a signal from the linear electrode is applied to the pixels of the liquid crystal layer through this photoconductive layer. As means for applying a ray of light from the linear luminous portion to the photoconductive layer, a light propagating characteristic is guaranteed on the light waveguide formed on the substrate and the ray of light from the luminous source is allowed to be induced to the light switching portion with high accuracy and high efficiency.

According to the optical address type display device according to the first aspect of the invention, the quantity of the picked light can be kept even at any place where the light pick-up portion is formed on the light waveguide. Hence, each photoconductive layer serves to uniformly perform a switching operation at any place. This results in offering an even display characteristic over the screen. The form of this light pick-up portion makes the working easier. Further, the size of this light pick-up portion may be changed at each of the light pick-up portions for easier working. If the total number n of the light pick-up portions is divided into 2 or more and 0.1 n or less blocks and the size of the light pick-up portions may be changed at each block, both of the characteristics, that is, workability and light picking evenness may be satisfied.

According to the optical address type display device according to the second aspect of the invention, a light signal can be guided from the light waveguide to the photoconductive layer without mechanically working the light waveguide. Further, the contact area between the light waveguide and the photoconductive layer is made larger along the transmission path. The quantity of picked light is kept even at any place where the light pick-up portion is formed on the light waveguide. Hence, each photoconductive layer can evenly do a switching operation at any place. This results in offering a display device having an even display characteristic over the screen.

Also, a light signal can be guided from the light waveguide to the photoconductive layer side through the middle layer without mechanically working the light waveguide. In this case, provision of the middle layer makes it possible to more smoothly define the material for the light waveguide and the photoconductive layer. The contact area among the light waveguide, the middle layer and the photoconductive layer is made larger along the transmission path so that the quantity of the picked light is kept constant at any place where the light pick-up portion is formed on the light waveguide. Hence, each photoconductive layer can do an even switching operation at any place and thus the resulting display device enables to have an even display characteristic over the screen.

According to the optical address type display device according to the third aspect of the invention, the present invention is capable of patterning the light pick-up portion with high accuracy and suppressing the degrade resulting from the heating or cooling of the subsequent process. Hence, the light propagating characteristic of the light waveguide is guaranteed so that the light may be incident to the light switching portion with high accuracy and high efficiency. This results in making it possible to provide a high-capacitance and high-resolution liquid crystal display element.

Further objects and advantages of the present invention will be apparent from the following description of the preffered embodiments of the invention as illustrated in the accompanying drawings.

BRIEF DESCRIPTION OF THE DRAWINGS

FIG. 7 is a perspective view showing a positional relation among a signal wire, a light switching element and a pixel electrode in the embodiment 4 of the present invention.

DESCRIPTION OF THE PREFERRED EMBODIMENTS

Later, embodiments of the present invention will be described.

EMBODIMENT 1

Figure 1:
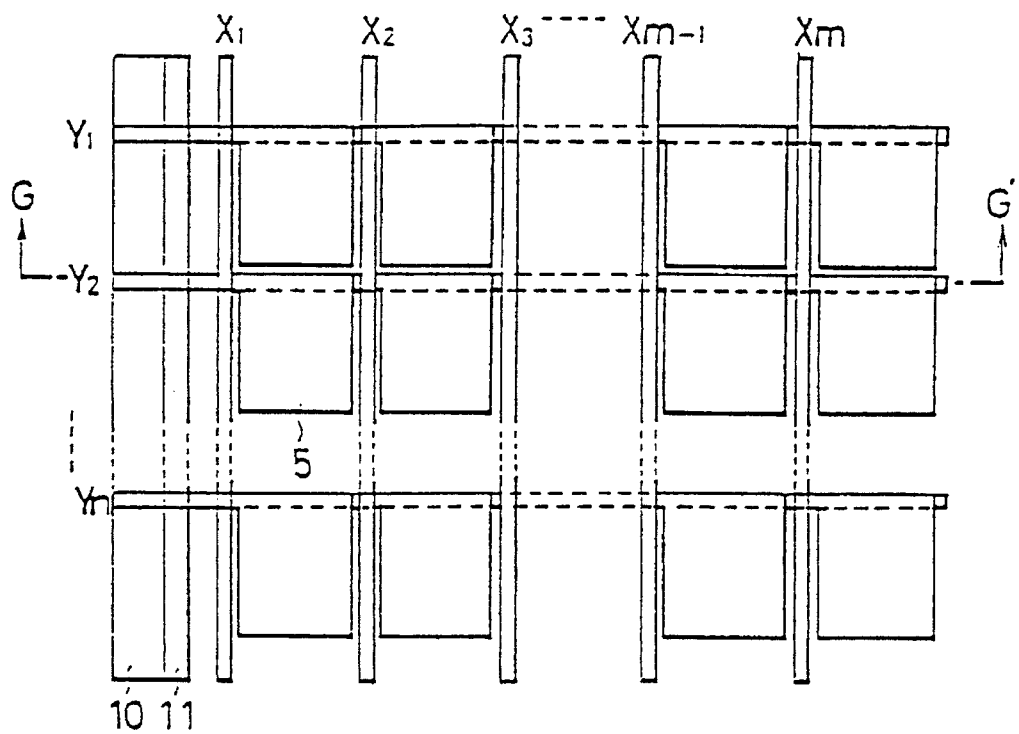
FIG. 1 is a plan view showing an optical address type active-matrix liquid crystal display device according to the embodiment 1 of the present invention.
Figure 2:
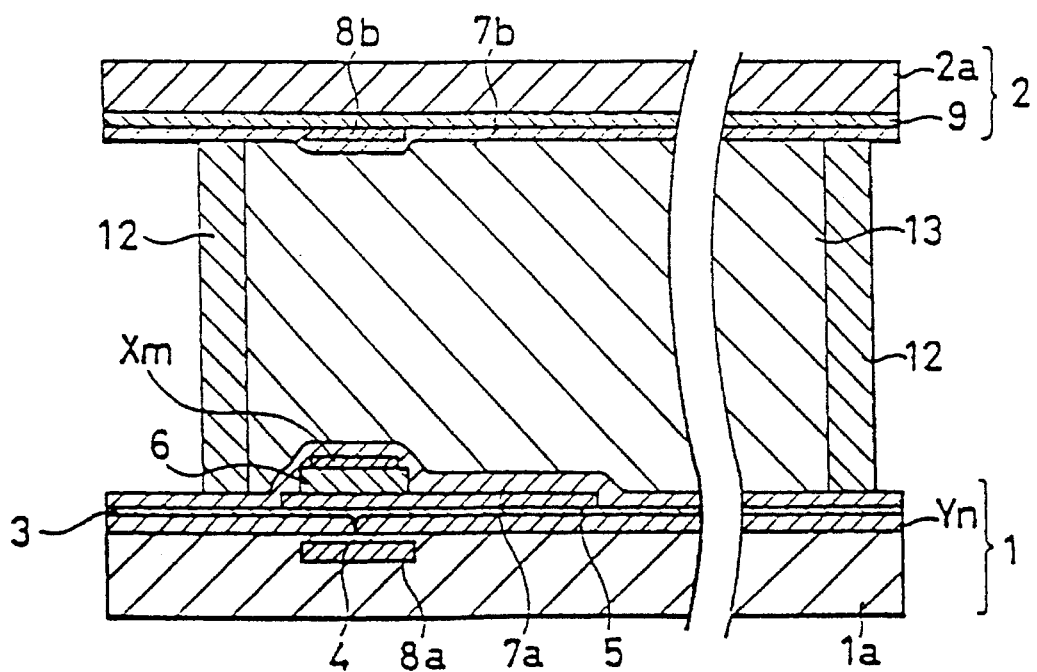
FIG. 2 is a view showing an element structure cut on the G–G' section.

FIGS. 1 and 2 show an arrangement of an optical address type active-matrix driving liquid crystal display device according to the present invention.

A basic substrate 1 composing a liquid crystal panel is arranged to have a glass substrate 1a as a base and a plurality of light waveguides $Y_1, Y_2, \ldots, Y_n$ arranged on the glass substrate 1a in the Y direction. The light waveguides $Y_1, Y_2, \ldots, Y_n$ are formed by diffusing thallium ion (Tl+) on the glass substrate 1a with heat and electric field and patterning the film. Each of the light waveguide $Y_1, Y_2, \ldots, Y_n$ has one end connected to a luminous portion made of a luminous element array 10 and a micro lens array 11 common to these light waveguides. In this embodiment, to form a large-screen and a high-definition display device, a high-output LD (laser diode) array is used as the luminous element array 10. If such a high output is not required, an LED (Light-emitting Diode) array may be used. To cover these light waveguides $Y_1, Y_2, \ldots, Y_n$, a clad layer 3 made of an SiO2 thin film is formed on the surface of the glass substrate 1a. A plurality of signal wires $X_1, X_2, \ldots, X_m$ are located on the clad layer 3 in the X direction and in a manner to be crossed with the light waveguides $Y_1, Y_2, \ldots, Y_n$. These signal wires $X_1, X_2, \ldots, X_m$ are made of Ti as a main material and are formed by the sputtering technique. As a material of the signal wires $X_1, X_2, \ldots, X_m$, in addition to Ti, any material may be used only if it meets the conditions about conductive performance and manufacturing process such as Ta, Cr, Al or Mo.

On each of the sections formed by crossing the adjacent light waveguides $Y_1, Y_2, \ldots, Y_n$ with the signal wires $X_1, X_2, \ldots, X_m$ respectively, a pixel electrode 5 made of a transparent conductive ITO film is provided on the clad layer 3. Part of the pixel electrode 5 is extended over each of the crossed portions between the light waveguides $Y_1, Y_2, \ldots, Y_n$ and the signal wires $X_1, X_2, \ldots, X_m$. A light switching element 6 made of a photoconductive layer is provided between the extended part of the pixel electrode 5 and each of the signal wires $X_1, X_2, \ldots, X_m$ at the location. The light switching element 6 is made of a photoconductive a-Si:H film. This a-Si:H film is formed to have a thickness of about 1 μm by means of a plasma CVD technique by using silane gas ($SiH_4$) and Hydrogen ($H_2$). Inside of the glass substrate 1a, a light cut-off layer 8a is provided at the corresponding location to each light switching element 6. This light cut-off layer 8a serves to prevent light (outer light) from the outer surface of the glass substrate 1a from being incident to the light switching element 6.

In the opposed substrate 2, an opposed electrode 9 made of a transparent conductive ITO film is formed on the overall surface of the glass substrate 2a served as a basic material of the substrate 2. The light cut-off layer 8b is provided at the corresponding location to the light switching element 6 on this opposed electrode 9 and serves to prevent light (outer light) from the outer surface of the glass substrate 2a of the opposed substrate 2 from being incident to the light switching element 6.

On each inside surface of the glass substrates 1a and 2a, an orientation film 7a or 7b made of polyimide is coated by a spin-coating technique. The orientation film 7a or 7b is subject to the rubbing treatment. As the orientation film 7a or 7b, it is possible to use an organic film such as a polyamide film, various LB films, an SiO film or an oblique evaporated film of $SiO_2$. Both of the substrates 1 and 2 formed as above are pasted with a seal 12 and a liquid crystal material 13 laid therebetween.

The display device formed as above operates as follows. A light signal may be guided from the luminous element array 10 to the light waveguides $Y_1, Y_2, \ldots, Y_n$ through a micro lens array 11.

On the light waveguides $Y_1, Y_2, \ldots, Y_n$, a light pick-up portion (light scattering portion) 4 is formed at each of the light switching elements 6. This light pick-up portion 4 is formed of a V groove on each of the light waveguides $Y_1, Y_2, \ldots, Y_n$ by means of a blade, for example. A light signal propagated through the light waveguides $Y_1, Y_2, \ldots, Y_n$ is scattered at the light pick-up portion 4 and then is applied to the light switching element formed at that location.

The light switching element 6 changes its impedance according to a bright/dark state of the applied light so as to control flow of current to the signal wires $X_1, X_2, \ldots, X_m$ and the pixel electrode 5 connected to the light switching element 6 for driving the liquid crystal 13. That is, in the light-applied state, the light switching element 6 lowers its impedance through the photoconductive effect so that the signal wires $X_1, X_2, \ldots, X_m$ may be electrically conducted with the pixel electrode 5. This results in applying a data signal to the liquid crystal 13 between the pixel electrode 5 and the opposed electrode 9.

In the dark state, the light switching element 6 raises its impedance so that the signal wires $X_1, X_2, \ldots, X_m$ may be electrically insulated from the pixel electrode 5. In this state, no data signal is applied to the liquid crystal 13 between the pixel electrode 5 and the opposed electrode 9. Hence, the voltage applied to the liquid crystal 13 when light is applied is maintained.

Figure 3:
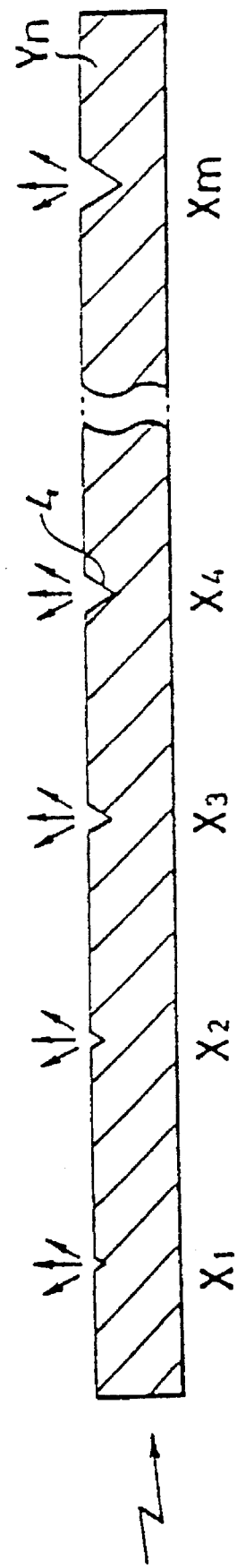
FIG. 3 is a sectional view showing a form of a light pick-up portion on a light waveguide included in the embodiment 1 of the present invention.

In this embodiment, at the location where the quantity of picked-up light is small on each of the light waveguides $Y_1, Y_2, \ldots, Y_n$, the V groove is made larger so that the area of the light scattering portion may be enlarged for compensating for the attenuated amount of the picked-up light. That is, as shown in FIG. 3, the V groove at the location near the light-incident side is shallow and small. The V groove is made gradually deeper and larger as it goes further from the light-incident side. With this design of the V groove, the quantity of light is kept equal in respective light pick-up portions 4, which makes it possible to provide all the light switching elements 5 with even element performance. This results in being able to obtain even display performance over all the screen of the display device.

Since this optical address type liquid crystal display device uses a ray of light as a scan signal, unlike the electric signal, no delay of a signal waveform is brought about through the adverse effect of wire resistance and capacitance. Further, according to this embodiment, an even light signal can be sent to any location on the screen. This makes it possible to realize a high-definition display even in a large display device.

In this embodiment, the form of the light pick-up portion 4 is formed like a V groove. Another form like a U groove or a semi-spheric concave may be effectively used. Further, such forms are effective when light is picked up by using coarseness or grating on the surface.

EMBODIMENT 2

The present invention is effective if the light waveguides $Y_1, Y_2, \ldots, Y_n$ are provided on the opposed substrate 2 and the light switching element 6 is mounted on a substrate and the light waveguides $Y_1, Y_2, \ldots, Y_n$ are mounted on the other substrate in the optical address type active-matrix driving liquid crystal display device as disclosed in the Japanese Patent Application No. Hei 3-248110 filed by the applicant of the present application.

Figure 4:
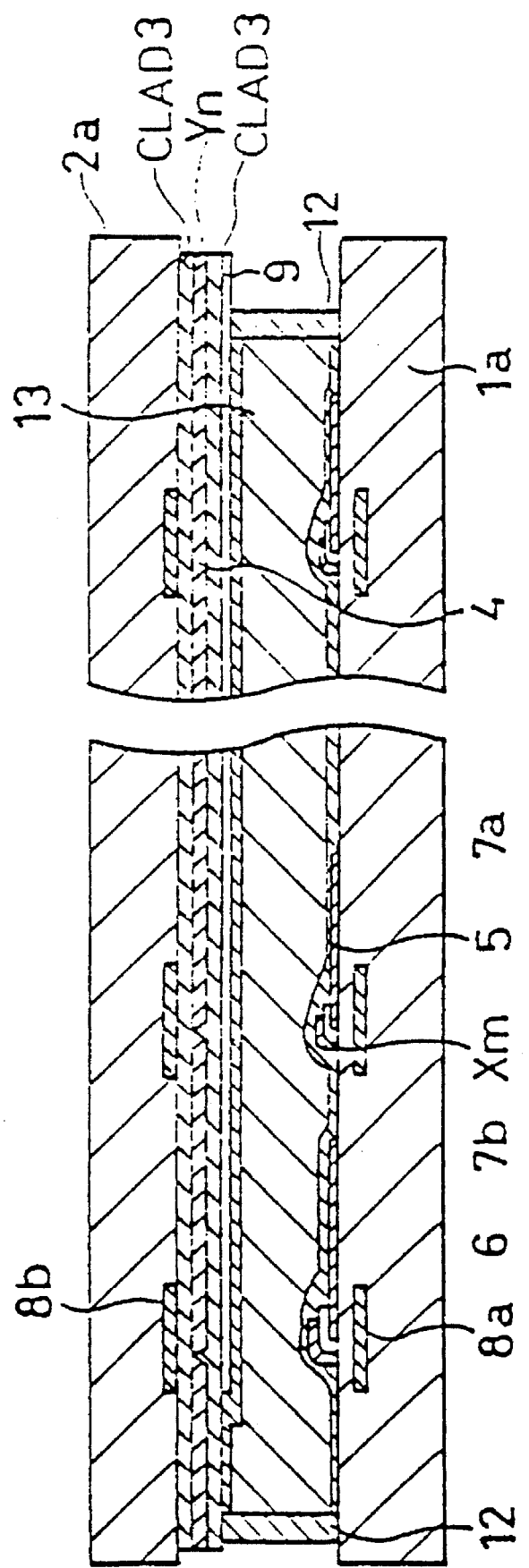
FIG. 4 is a sectional view showing an optical address type active-matrix liquid crystal display device according to the embodiment 2 of the present invention.

FIG. 4 shows an arrangement of a liquid crystal display device according to the embodiment 2. The basic element arrangement of this embodiment is the same as the liquid crystal display device according to the embodiment 1, except that the light waveguides $Y_1, Y_2, \ldots, Y_n$ for transmitting a light signal are provided on the inside of the opposed substrate 2 to the basic substrate 1 having the light switching element 6 formed thereon. In this figure, a luminous element array and a micro lens array are not illustrated. Also in this embodiment 2, like the embodiment 1, the form of the light pick-up portion 4 is made larger as the light pick-up portion 4 goes further from the light-incident side along each light waveguide. This results in being able to obtain even display performance on the overall screen of the display device.

EMBODIMENT 3

The display device according to the invention may take an arrangement that the light pick-up grooves have respective sizes for the light waveguides or an arrangement that a plurality of light pick-up grooves are assumed as one combination along the transmission path and the light pick-up grooves have respective sizes for the combinations.

Figure 5A:
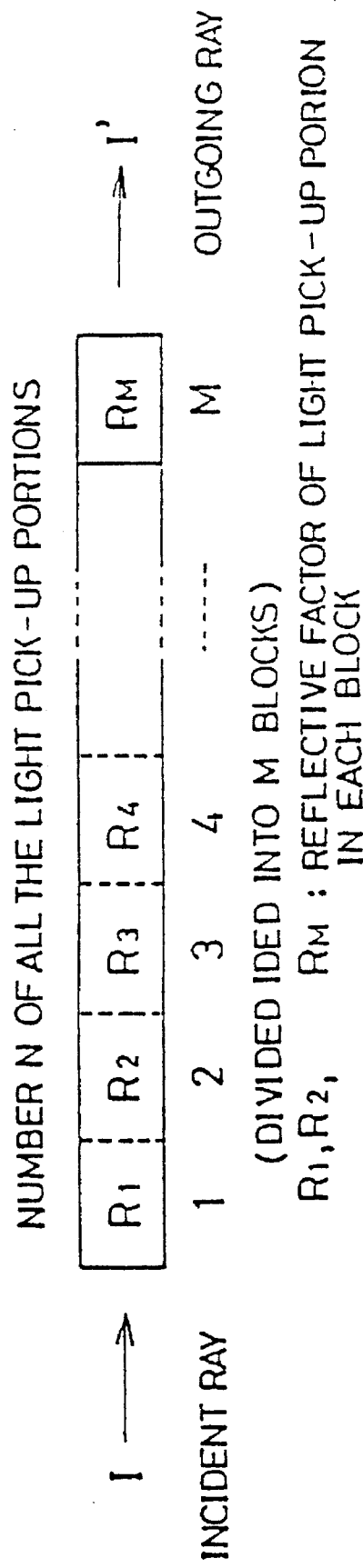
FIGS. 5a and 5b are views showing a light waveguide included in the display device according to the embodiment 3 of the present invention.

FIG. 5a is a model view showing a light waveguide provided in the display device according to this embodiment. The display device is arranged to divide the light pick-up portions into several blocks along the transmission path of the light waveguide. For each block, the size of the light pick-up groove is changed so that the reflective factor R viewed from the inside of the light waveguide may be changed. The other part of the arrangement is likewise to that of the display device according to the embodiment 1 or 2.

Figure 5B:
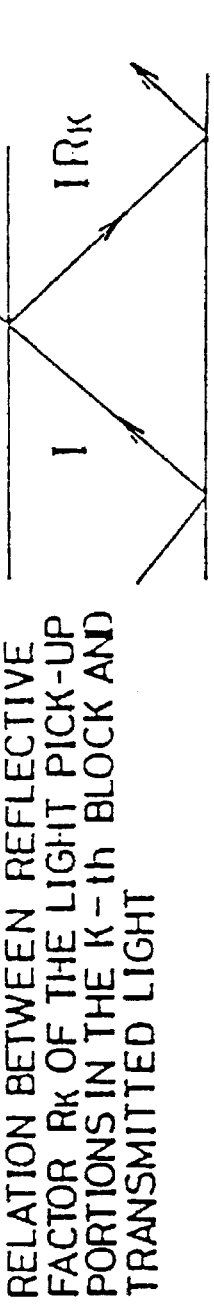

In this display device, a light signal entered from one end of the light waveguide as an incident ray at the light intensity I is picked out of the light waveguide at each light pick-up portion and then is applied to the light switching element provided near the light waveguide. The remaining light outgoes from the end of the light waveguide at the light intensity I'. The light pick-up portions (total number is n) are divided into M blocks each consisting of some portions. For each block, the light pick-up grooves have respective sizes so that the reflective factors of light viewed from the inside of the light waveguide are respective in the blocks. FIG. 5b shows that the light pick-up portions at the k-th block (k=1, 2, ..., M) along the path of the light waveguide serve to pick up light at a ratio of $(1-R_k)$ against the reflective factor $R_k$ of light at these portions.

Figure 6:
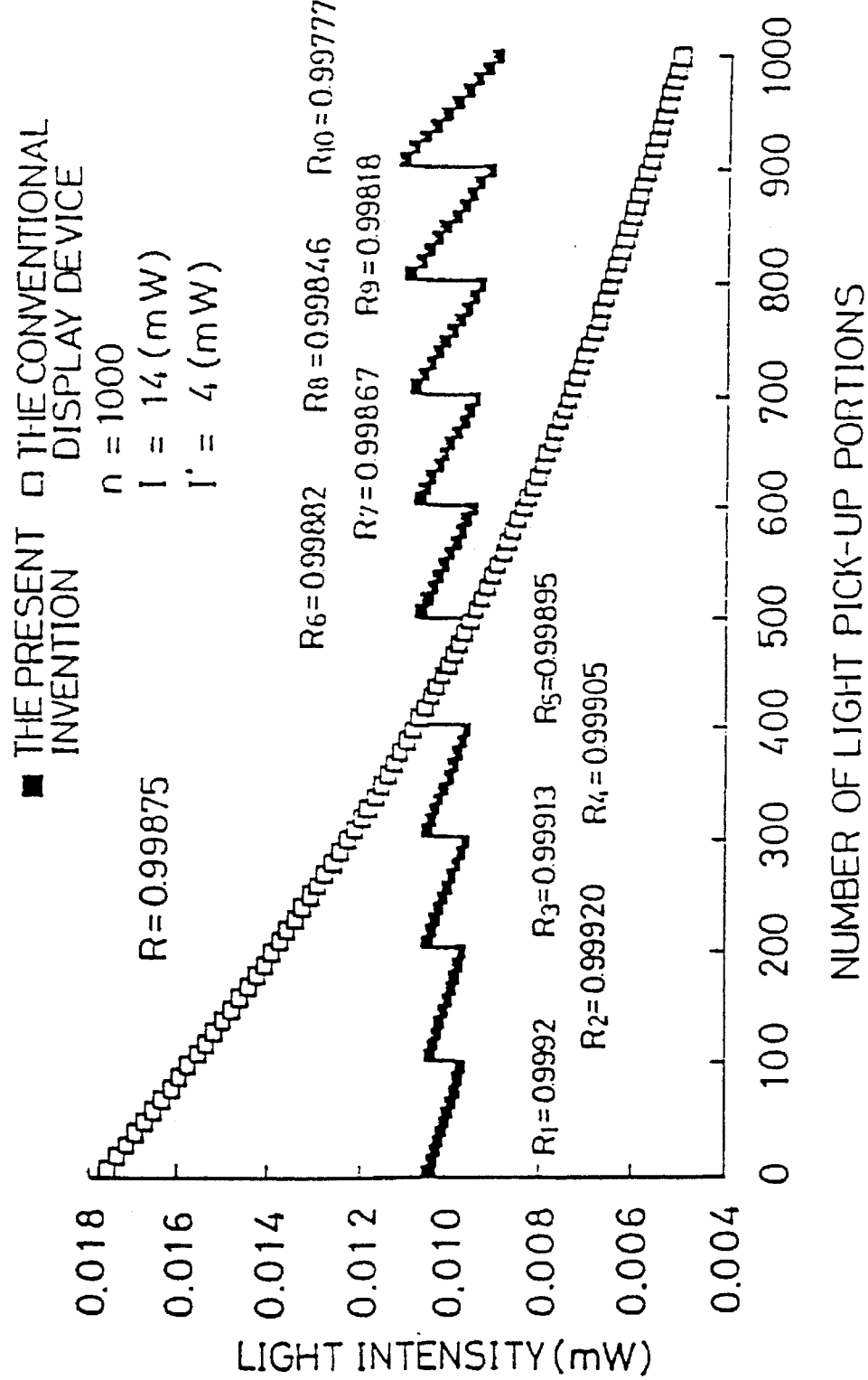
FIG. 6 is a view, showing a light pick-up intensity at each light pick-up portion.
Figure 30:
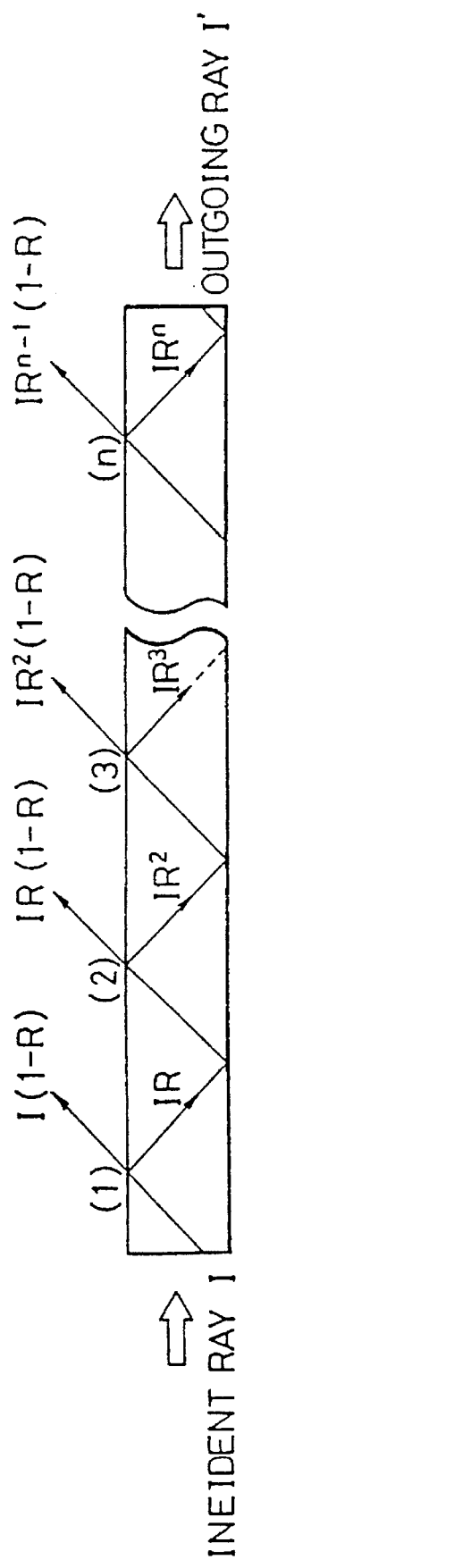
FIG. 30 is a model view showing a light waveguide in the prior art.

FIG. 6 shows the light pick-up intensity of each light pick-up portion assuming that n=1000, M=10 blocks, I=14 mW, and I'=4 mW. Herein, to pick up light of 1 mW at each block, the size of the light pick-up groove is changed in a manner that $R_1=0.99926$, $R_2=0.99920$, $R_3=0.99913$, $R_4=0.99915$, $R_5=0.99895$, $R_6=0.99882$, $R_7=0.99867$, $R_8=0.99846$, $R_9=0.99818$ and $R_{10}=0.99777$. Further, FIG. 6 shows the light pick-up intensity of each light pick-up portion in the conventional display device having a light waveguide as shown in FIG. 30 as a compared example. In the display device as a compared result, the light signal entered from the end of the light waveguide at the light intensity I is picked out of the light waveguide at each light pick-up portion (1), (2), (3), . . . . , (n) and is applied to the light switching element provided near the light waveguide. The remaining light outgoes from the other end of the light waveguide at the light intensity I'. Each light pick-up portion provides a light pick-up groove having the same form and size so that the reflective factor R of light as viewed from the inside of the light waveguide may be kept constant. Each light pick-up portion serves to pick up light out of the light waveguide at a rate of (1−R) to the light reaching each light pick-up portion. In the conventional display device, a light of 10 mW may be picked out as compared to the incident ray of 14 mW.

As will be understood from these figures, the conventional display device is arranged to pick up light of I (I−R) at the first light pick-up portion (1) and light of $IR^{999}$ (I−R) at the 1000th light pick-up portion (1000). It means that the first light pick-up portion (1) serves to pick up light of 0.0175 mW and the 1000th light pick-up portion (1000) serves to pick up light of 0.00802 mW. At each light pick-up portion (n), the light pick-up intensity is reduced exponentially with the increase of n and thus the light cannot be picked up at even light intensity. In this case, the light switching element is required to have such a conductive rate characteristic as sufficiently displaying an image even if the quantity of applied light is 0.00502 mW (corresponding to the 1000-th light pick-up portion). However, for the light switching element having such a conductive ratio characteristic, the light application is excessive if the quantity of the applied light is 0.0175 mW (corresponding to the first light pick-up portion). Hence, the performance of all the light switching element is not allowed to be kept even.

On the other hand, the display device according to this embodiment is arranged so that the intensity of light picked up at each light pick-up portion stays in the range of 0.01±0.002 mW. Hence, the substantially same intensity of light can be picked up on the overall area of the light waveguide. In this case, any light switching element may be used if it has such a conductive ratio characteristic as sufficiently displaying an image in the case of the quantity of the applied light of 0.008 mW. It may sufficiently correspond to the quantity of applied light of 0.012 mW. Hence, the performances of all the light switching elements are allowed to be kept even.

In the display device according to this embodiment, the reflective factor R at each light pick-up portion may be defined as follows.

Assuming that the total number of the light pick-up portions provided on one light waveguide is n, the intensity of the incident light to the light waveguide is I, and the intensity of the outgoing light from the light waveguide is I', the light reflective factor at the light pick-up portion viewed from the inside of the light waveguide may change into M kinds from $R_1$ to $R_M$. The light pick-up portion can be divided into M blocks, each of which includes n/M light pick-up portions. At this time, the light entered into the k-th block (reflective factor $R_k$) numbered along the transmission path of the light waveguide is attenuated by a factor of $R_k^{n/M}$. At the k-th block, the light is incident to the block at the light intensity of I−(I−I') k/M and outgoes from the block at the intensity of I−(I−I') (k−1)/M. The following expression (1) may be established among the reflective factor $R_k$, the total number n of the light pick-up portions, the number M of divided blocks, the block number k, the light intensity I provided when light is incident to the light waveguide, and the light intensity I' provided when light outgoes from the light waveguide.

Expression 1

The relative expression for deriving a value of R is:

$$\text{for the first block;} \quad \frac{I}{I - \frac{I-I'}{M}} = \frac{1}{R_1^{n/M}} \quad (1)$$

$$\text{for the second block;} \quad \frac{I - \frac{I-I'}{M} \times 1}{I - \frac{I-I'}{M} \times 2} = \frac{1}{R_2^{n/M}}$$

$$\text{for the third block;} \quad \frac{I - \frac{I-I'}{M} \times 2}{I - \frac{I-I'}{M} \times 3} = \frac{1}{R_3^{n/M}}$$

$$\text{for the k-th block;} \quad \frac{I - \frac{I-I'}{M} \times (k-1)}{I - \frac{I-I'}{M} \times k} = \frac{1}{R_k^{n/M}}$$

From the expression (1), $R_k$ can be defined at each block. With the value of $R_k$, the size of the light pick-up groove can be set.

According to the aforementioned embodiment, the description has been expanded on the assumption that the number M of divided blocks (the kinds of size change) is 10. To pick up even light from each light pick-up groove, it is better to increase the number M of the divided blocks. For example, if the number M of the divided blocks is set as 100, the quantity of light to be picked out of each light pick-up portion stays in the range of 0.01±0.0002 mW, which means that the picked light is made more even. On the other hand, if the number M of divided blocks is set as a too many value, the kinds of the size changes of the light pick-up groove are made too many when working the device. As a result, the working is made difficult because the size is required to be finely controlled. Hence, the most approximate range of the number M of divided blocks is changed according to the number n of the light pick-up portions per one scan line (light waveguide). It is preferable to set the range as 2 or more but 0.1 n or less.

In the foregoing embodiment, since n light pick-up portions are divided into M blocks, the number of the divided blocks is n/M. Each block may include a different number of light pick-up portions.

EMBODIMENT 4

FIGS. 7 and 8 show an arrangement of a liquid crystal display device according to the embodiment 4. In these figures, the luminous element array and the micro lens array are not shown. On the light waveguides $Y_1, Y_2, \ldots, Y_n$, an $SiO_2$ film may be formed as a clad layer 3 by means of the sputtering technique. On the clad layer 3, an a-Si:H film made of a photoconductive material is formed as a light switching element 6 by means of the plasma CVD technique and is patterned. The clad layer 3 is removed at the location where the light switching element 6 is formed. At this location, the light waveguides $Y_1, Y_2, \ldots, Y_n$ come into direct contact with the light switching element 6. Parts of the signal wires $X_1, X_2, \ldots, X_m$ are extended over to cover one end of the top of the light switching element 6. The other end of the top of the light switching element 6 is covered by the extended part of the pixel electrode 5 formed directly on the clad layer 3.

Next, the description will be oriented to the method for picking out of a light signal from the light waveguides $Y_1, Y_2, \ldots, Y_n$ to the light switching element 6. In this embodiment, when light is picked out of the light waveguide, light transmittance and reflection between two layers resulting from the difference between the indexes of refraction may be used without having to use any flaw or coarseness on the surface.

Figure 9:
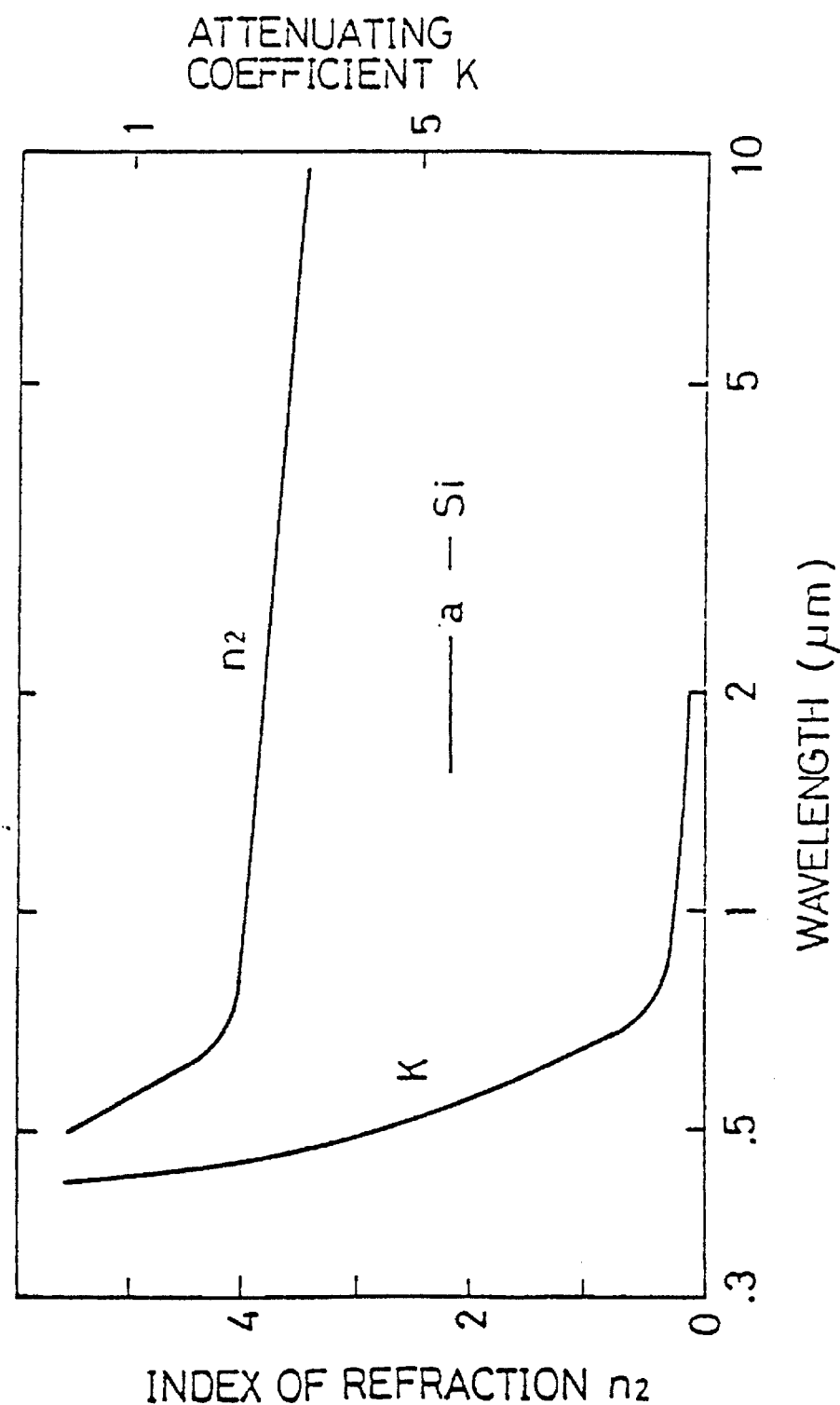
FIG. 9 is a view showing a relation between an index of refraction $n_2$ and an attenuating factor k against a ray of light with each wavelength, about hydrogenated amorphous silicon (a-Si:H).

In general, when a ray of light enters from a medium having an index of refraction $n_1$ to another medium having an index of refraction $n_2$ at an incident angle θ (an angle formed with a vertical on the joint surface), the ray of light meeting the expression of $n_1 \sin θ > n_2$ is mirror-reflected. Hence, the ray of light is allowed to be propagated through the light waveguides $Y_1, Y_2, \ldots, Y_n$. On the other hand, the almost of the ray of light meeting the expression of $n_1 \sin θ < n_2$ except the light reflected on the surface passes through the interface. Table 1 lists the index of refraction $n_1$ of the general light waveguides $Y_1, Y_2, \ldots, Y_n$ used in the optical address display device. Further, FIG. 9 shows a relation between an index of refraction $n_2$ and an attenuating coefficient k of hydrogenated amorphous silicon (a-Si:H) against the light having each wavelength (referred, in "Amorphous Handbook" published by Science Forum, edition.).

[Table 1]

| Various Light Waveguides | Index of Refraction of Core (τ = 633 nm) |
|---|---|
| Quartz Fiber | 1.46 |
| Plastic Fiber | 1.49 |
| Ion Diffused (Tl+) Glass Light Waveguide | 1.6 to 1.7 |
| Quartz System Light Waveguide formed by Flame Hydrolysis Disposition Method | 1.47 |
| Polymer Light Waveguide (ex. PCZ) | 1.59 |

In this embodiment, the ion (Tl+) diffused light waveguides are used as the light waveguides $Y_1, Y_2, \ldots, Y_n$. The index of refraction $n_1$ of the light waveguide is about 1.67. Since the index of refraction $n_4$ of the clad layer 3 is about 1.46, in the area where the clad layer 3 exists on the light waveguides $Y_1, Y_2, \ldots, Y_n$, only the light entered at an incident angle θ1 meeting the relation of;

$n_1 \sin θ_1 > n_4$ is mirror-reflected on the interface so that the light may be propagated through the light waveguides $Y_1, Y_2, \ldots, Y_n$, where $θ_1$ is an incident angle of a ray of light entered from the light waveguide to the clad layer 3.

Figure 8A:
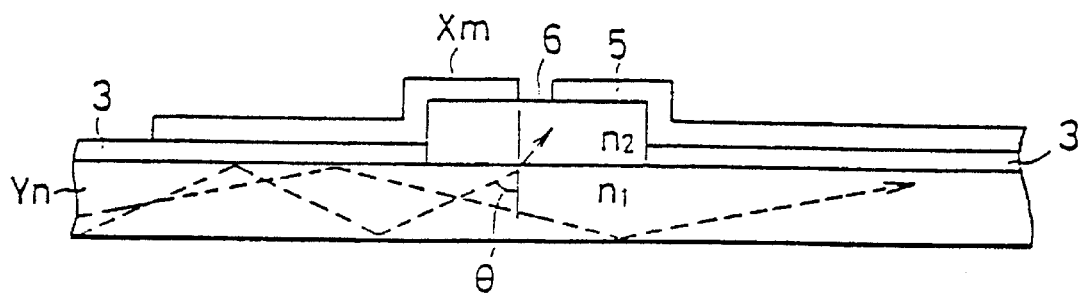
FIG. 8 is a sectional view cut on the B–B' line of FIG. 7 and FIGS. 8(a), 8(b) show a large window form of a clad layer
FIGS. 8(c), 8(d) show a small window form of the clad layer.

On the other hand, at the place where the light switching element 6 is formed, the clad layer 3 formed on the light waveguides $Y_1, Y_2, \ldots, Y_n$ is removed so that the light waveguides $Y_1, Y_2, \ldots, Y_n$ may directly contact with the light switching element 6. The hydrogenated amorphous silicon used for the light switching element 6 in this embodiment has an index of refraction $n_2$=4 to 5 against light having a wavelength of about τ=633 nm. Hence, since the used light has a wavelength of about τ=633 nm, the index of refraction n1 of the light waveguides $Y_1, Y_2, \ldots, Y_n$ is about 1.67. The relation among this index of refraction $n_1$, the index of refraction $n_2$ of the light switching element 8 and the incident angle θ of the light formed between the light waveguides $Y_1, Y_2, \ldots, Y_n$ and the light switching element 6 does not depend on the incident angle θ. Hence, the relation of $n_1 \sin θ < n_2$ is constantly met. As shown in FIGS. 8a and 8c, the direct contact between the light waveguides and the light switching element allows the light propagated inside of the light waveguides $Y_1, Y_2, \ldots, Y_n$ to be entered to the light switching element 6 on the contact surface.

Figure 8B:
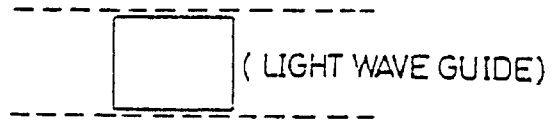
Figure 8C:
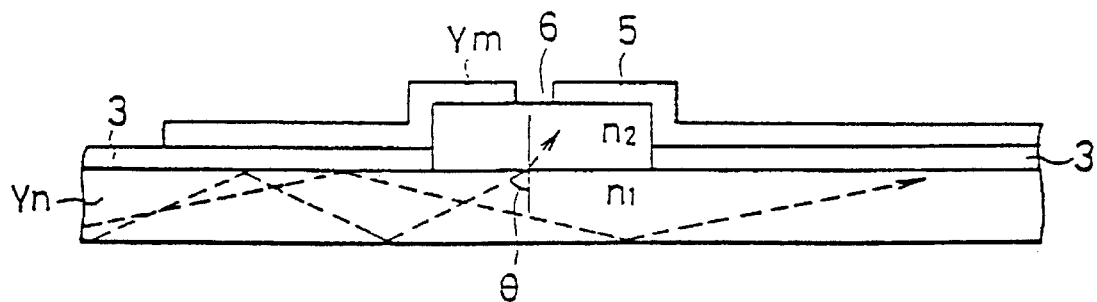
Figure 8D:
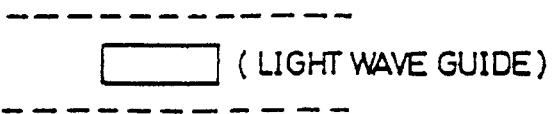

The size of the removal pattern (window form) of the clad layer 3 in the light pick-up portion located on the further side from the luminous element shown in FIG. 8b is made larger than the size of the pick-up form of the light on the nearer side of the luminous element shown in FIG. 8d. Hence, at each spot, the even quality of light can be picked up. This makes it possible to provide all the light switching elements 6 with uniform performance.

In the light pick-up method used in the embodiment, it is not necessary to mechanically or chemically form the blemished or coarse surface of the light waveguides $Y_1, Y_2, \ldots, Y_n$. Therefore, this embodiment does not bring about any problem such as breakage of a substrate or a light waveguide in the mechanical work, degrade of a working accuracy accompanied with abrasion of a blade used for the working, or a high cost. Further, it does not have any difficulty in finely controlling an impair or coarseness on the surface as in the case of the chemical working or in reproducibility.

In this embodiment, when the signal light is guided from the light waveguides $Y_1, Y_2, \ldots, Y_n$ to the light switching element 6, no idle scattered light (light scattered to the opposite side to the light switching element or the other peripheral side) is brought about. This leads to effective use of light.

Also in this embodiment, like the embodiment 3, the light pick-up portion formed along one light waveguide may be divided into several blocks so that the size of the removal pattern of the clad layer 3 may be changed according to each block.

EMBODIMENT 5

Figure 10:
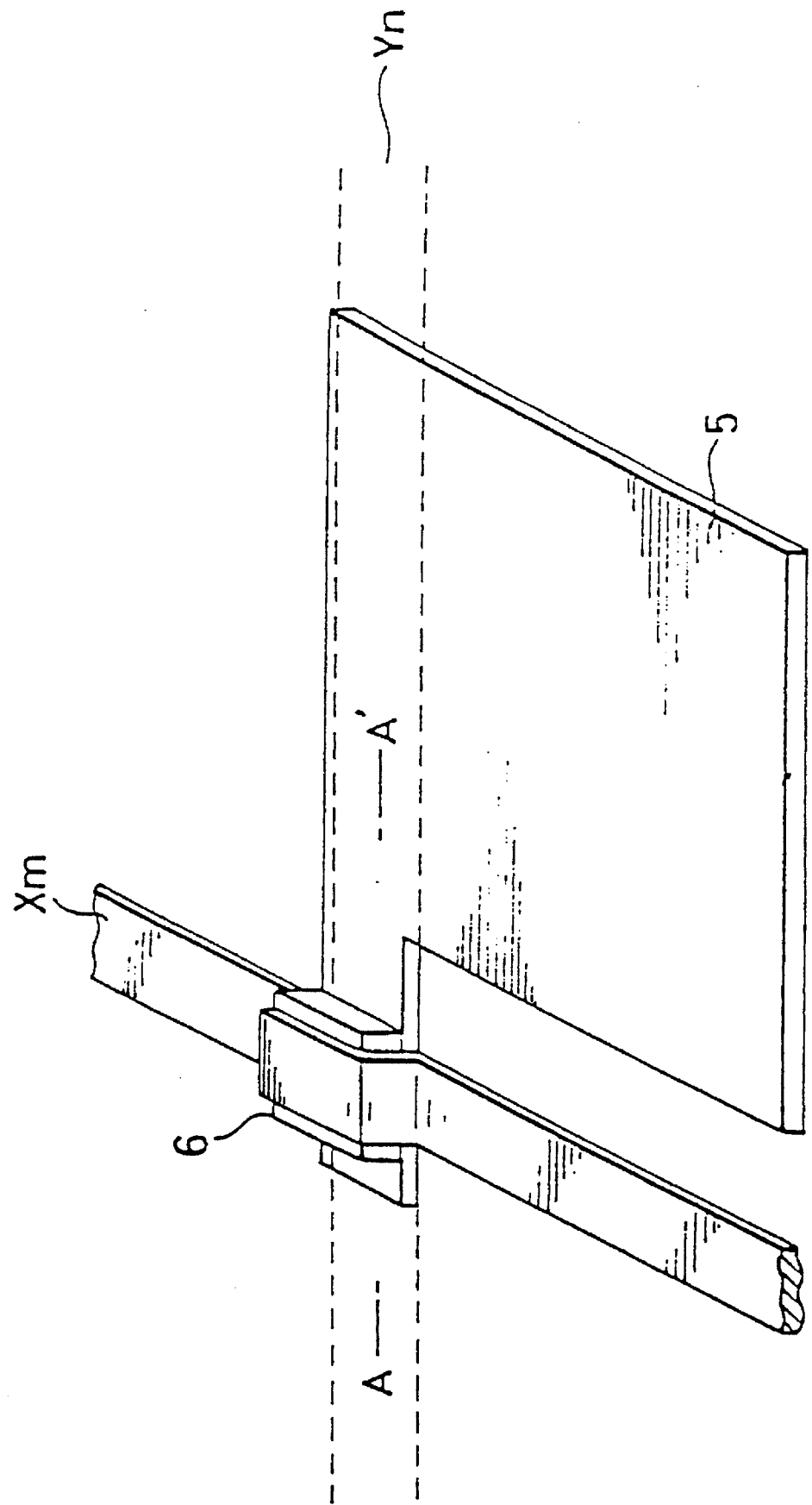
FIG. 10 is a perspective view showing a positional relation among a signal wire, a light switching element and a pixel electrode in the embodiment 5 of the present invention.
Figure 11A:
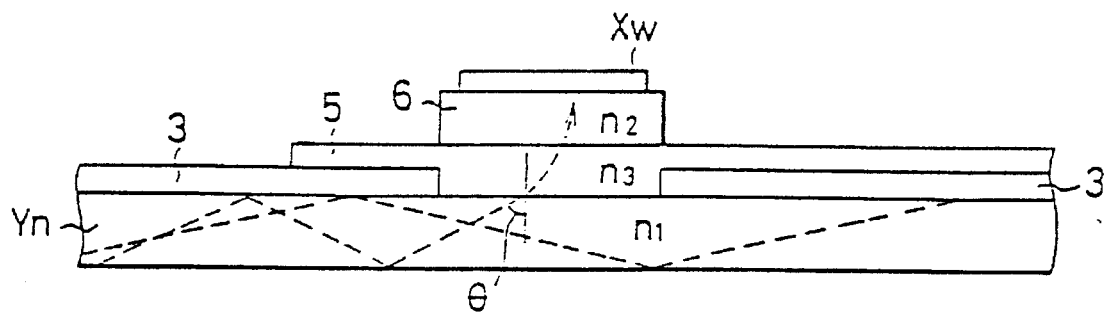
FIG. 11 is a sectional view cut on the A–A' of FIG. 9 and FIGS. 11(a), 11(b) show a large window form of the clad layer
FIGS. 11(c), 11(d) show a small window form of the clad layer.
Figure 11C:
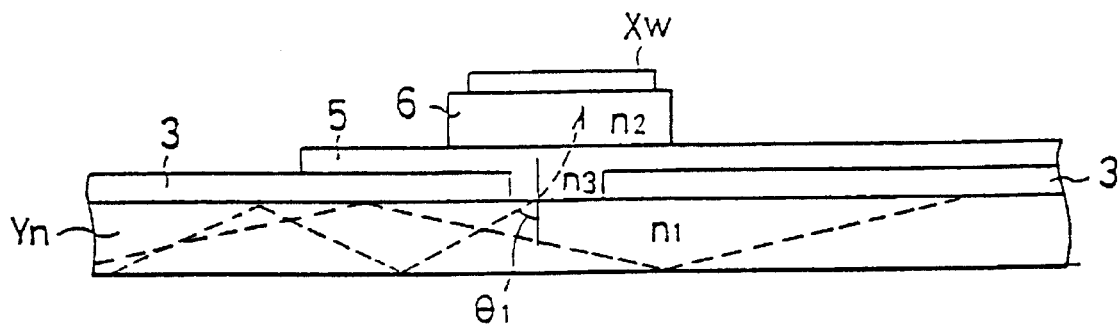
Figure 12:
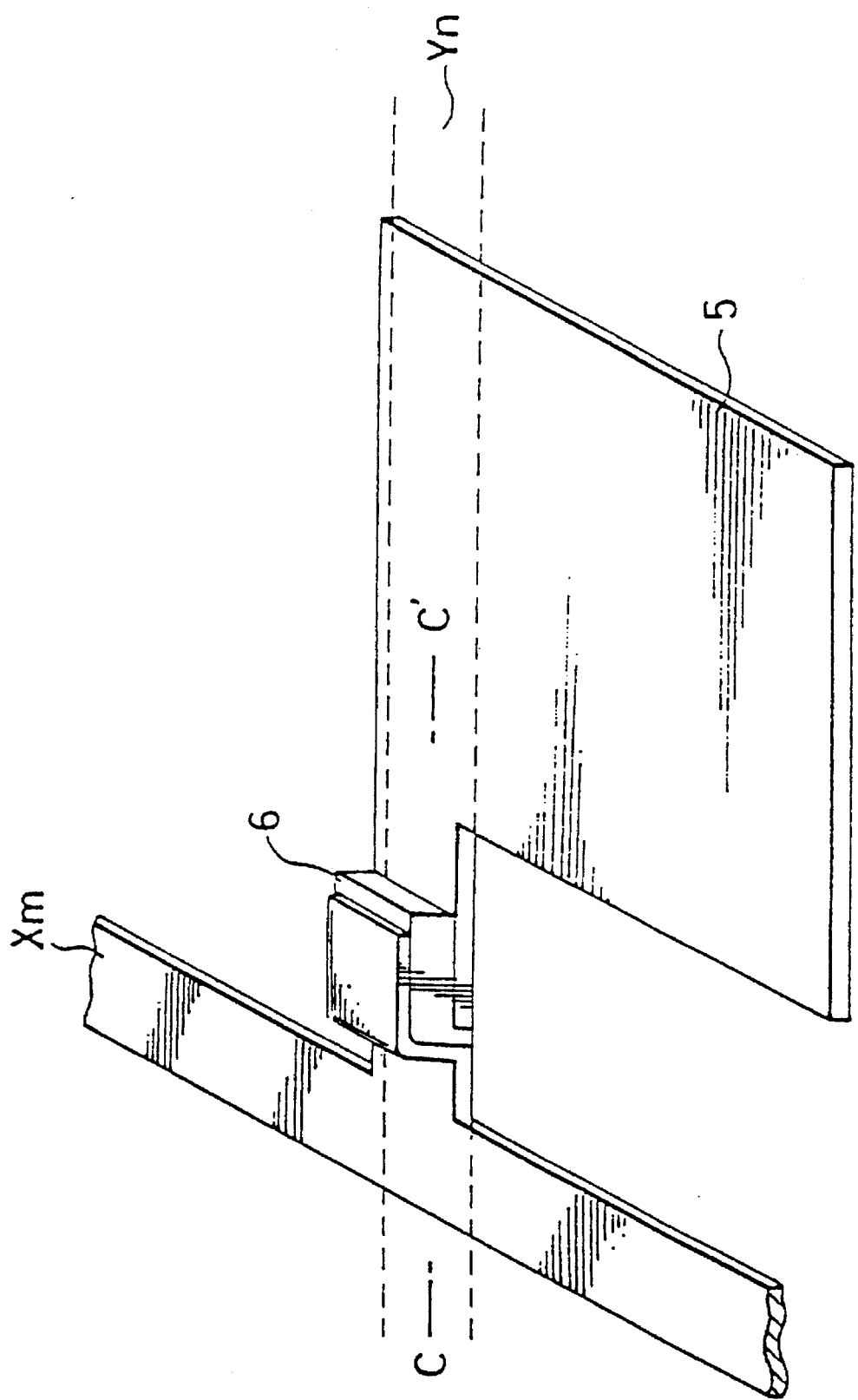
FIG. 12 is a perspective view showing a positional relation among a signal wire, a light switching element and a pixel electrode in the embodiment 5 of the present invention.
Figure 13A:
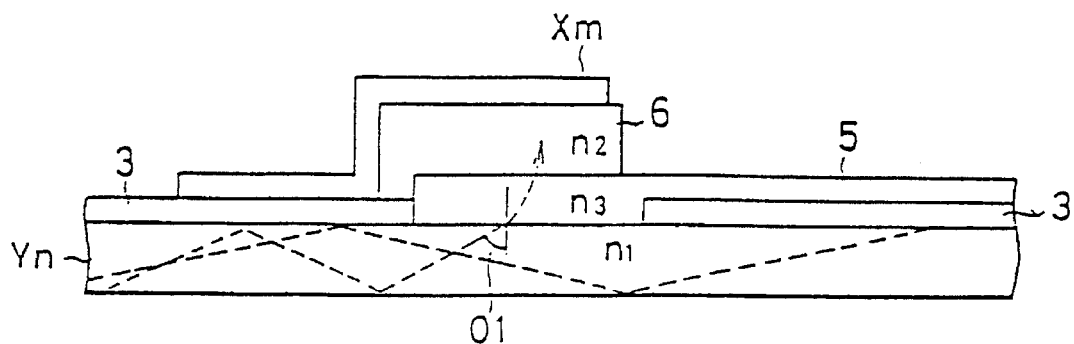
FIG. 13 is a sectional view cut on the line C–C' of FIG. 12 and FIGS. 13(a), 13(b) show a large window form of the clad layer
FIGS. 13(c), 13(d) show a small window form of the clad layer.

FIGS. 10 and 12 show a positional relation among the signal electrodes $X_1, X_2, \ldots, X_m$, the light switching element 6, the pixel electrode 5, and the light waveguides $Y_1, Y_2, \ldots, Y_n$ according to the embodiment 5. FIGS. 11a and 11c show an element structure as viewed from the sectional view of the A–A' line of FIG. 10. FIGS. 13a and 13c show an element structure as viewed from the sectional view of the C–C' line of FIG. 12. Both of the element structures shown in FIGS. 10 and 12 are the essentially same for the purpose of picking up a light signal, except that both have respective forms of the connecting portions between the pixel electrode 5 and the signal electrodes $X_1, X_2, \ldots, X_m$ connected to the switching element 6. That is, the clad layer 3 is removed at the place where the light switching element 6 is formed and part of the pixel electrode 5 intruded to the removed part of the clad layer 3 comes into contact with the light waveguides $Y_1, Y_2, \ldots, Y_n$. The light switching element 6 is formed in contact with this pixel electrode 5 so that the element 6 may be laid between the signal electrodes $X_1, X_2, \ldots, X_m$ on the light switching element 6 and the pixel electrode 5.

Figure 14:
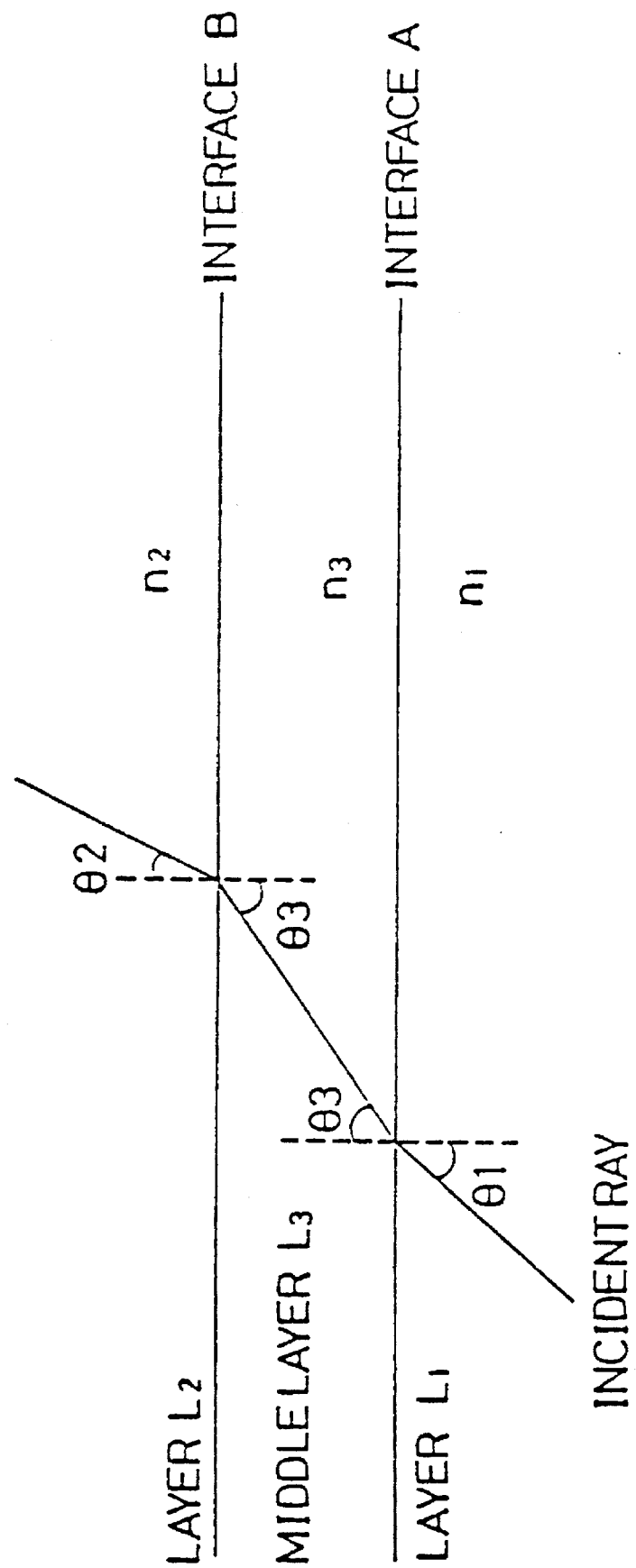
FIG. 14 is a view showing a light path formed when a ray of light passes through three layers having respective indexes of refraction.

In the structure shown in FIG. 14, three layers having respective indexes of refraction, $L_1$ (index of refraction $n_1$), $L_3$ (index of refraction $n_3$), and $L_2$ (index of refraction $n_2$) are laminated in the describing sequence. FIG. 14 shows a light path arranged so that a ray of light is entered at an incident angle $\theta_1$ from the layer $L_1$ to the layer $L_3$ and at an incident angle $\theta_3$ from the layer $L_3$ to the layer $L_2$, and outgoes at an incident angle $\theta_3$ to the layer $L_2$. At this time, the relation of $$n_1 \sin \theta_1 = n_3 \sin \theta_3 = n_2 \sin \theta_2$$

is established. The condition that the light entered at the incident angle $\theta_1$ passes through the interface A is;

$$n_1 \sin \theta_1 < n_3$$

The condition that the light entered at the incident angle $\theta_1$ passes through the interface B is;

$$n_1 \sin \theta_1 < n_2$$

Hence, if the relations of $n_1 \sin \theta_1 < n_3$ and $n_1 \sin \theta_1 < n_2$ are met, the light is allowed to be guided from the layer $L_1$ to the layer $L_2$. The addition of the middle layer $L_3$ to the layers $L_1$ and $L_2$ makes it possible to more smoothly define the element structure. The embodiment 5 is arranged so that the pixel electrode 5 serves as the middle layer $L_3$.

The pixel electrode 5 is made of an ITO film and its index of refraction $n_3$ is about 2. The index of refraction $n1$ of the light waveguides $Y_1, Y_2, \ldots, Y_n$ is 1.67. On the interface between the light waveguides $Y_1, Y_2, \ldots, Y_n$ and the pixel electrode 5, the relation of $$1.67 \sin \theta_1 < 2$$

is established independently of the value of the incident angle $\theta_1$ formed between the light waveguides $Y_1, Y_2, \ldots, Y_n$ and the pixel electrode 5. Hence, the light signal propagated through the light waveguides $Y_1, Y_2, \ldots, Y_n$ is allowed to be transmitted to the pixel electrode 5. The light switching element 6 formed on the pixel electrode 5 is made of a-Si:H, the index of refraction $n_2$ of which is 4 to 5. Hence, the relation of $n_1 \sin \theta_1 < n_2$ can be established independently of the incident angle $\theta_1$ of light passed from the pixel electrode 5 to the light switching element 6. Hence, the light signal of the light waveguides $Y_1, Y_2, \ldots, Y_n$ is allowed to be transmitted to the light switching element 6 through the pixel electrode 5.

As such a material of the pixel electrode 5 as keeping the index of refraction $n_3$ meeting the relations of $n_1 \sin \theta_1 < n_3$ and $n_1 \sin \theta_1 < n_2$, concretely, 1.67 or more index of refraction $n_3$ in the condition that the index of refraction $n_2$ is 4 to 5 irrespective of the incident angle $\theta_1$ of light passed from the pixel electrode 5 to the light switching element 6, $In_2O_3$ or $SnO_2$ may be used in addition to the ITO film. Further, if the thickness of the pixel electrode 5 (index of refraction $n_3$) has a smaller value than the used wavelength (for example, in the case that the pixel electrode 5 has a thickness of 100 nm or some against a visible ray of light), the index of refraction $n_3$ of the pixel electrode 5 has a small effect on the transmitted light. The condition for light transmittance is defined only by the index of refraction $n_1$ of the light waveguides $Y_1, Y_2, \ldots, Y_n$ and the index of refraction $n_2$ of the light switching element 6. That is, if only the relation of $n_1 \sin \theta_1 < n_2$ is met, the light is allowed to be transmitted from the light waveguides $Y_1, Y_2, \ldots, Y_n$ to the light switching element 6.

Also in this embodiment, the difference between the indexes of refraction or the method for picking up light may be used. It may offer the same effect as the embodiment 4.

Figure 11B:
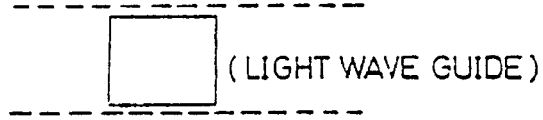
Figure 11D:
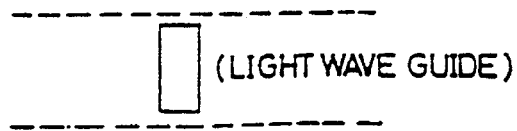
Figure 13B:
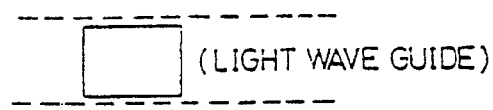
Figure 13C:
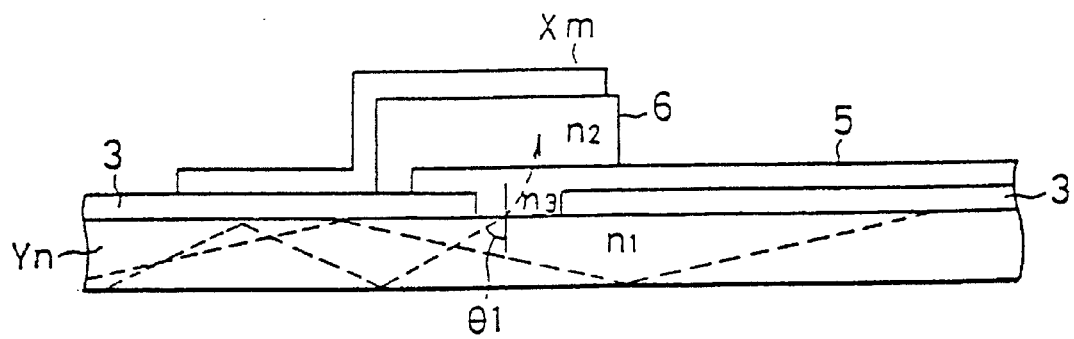
Figure 13D:
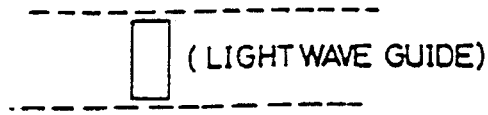

Further, the size of a removal pattern (window form) of the clad layer 3 in the light pick-up portion on the further side from the luminous element shown in FIG. 11b or 13b is made larger than the size of the form for picking up light on the nearer side of the luminous element shown in FIG. 11d or 13d, for the purpose of picking up even quantity of light at any place. This makes it possible to provide all the light switching elements 6 with uniform performance.

As described above, in the embodiment 5, the area of the portion directly contacting the light guiding portions of the light waveguides $Y_1, Y_2, \ldots, Y_n$ with the light switching element 6 or the area of the portion jointing the light guiding portions of the light waveguides $Y_1, Y_2, \ldots, Y_n$, the pixel electrode 5, and the light switching element 6 in the describing sequence, that is, the window form pattern of the clad layer 3 is allowed to be simply and accurately controlled by means of a photolithography technique. For example, the dry etching technique using $CF_4$ gas or the wet etching technique using a hydrogen fluoride system etchant. Hence, a high-density display device, for example, a high-definition display (HDTV) using about 1000 signal electrodes and about 1000 light switching elements 6 and the light pick-up portions per one of the light waveguides $Y_1, Y_2, \ldots, Y_n$, can be easily manufactured.

Also in this embodiment, like the embodiment 3 or 4, the light pick-up portions provided along one light waveguide are divided into several blocks so that the removal pattern of the clad layer 3 may be changed in size for each of the blocks.

EMBODIMENT 6

Figure 15:
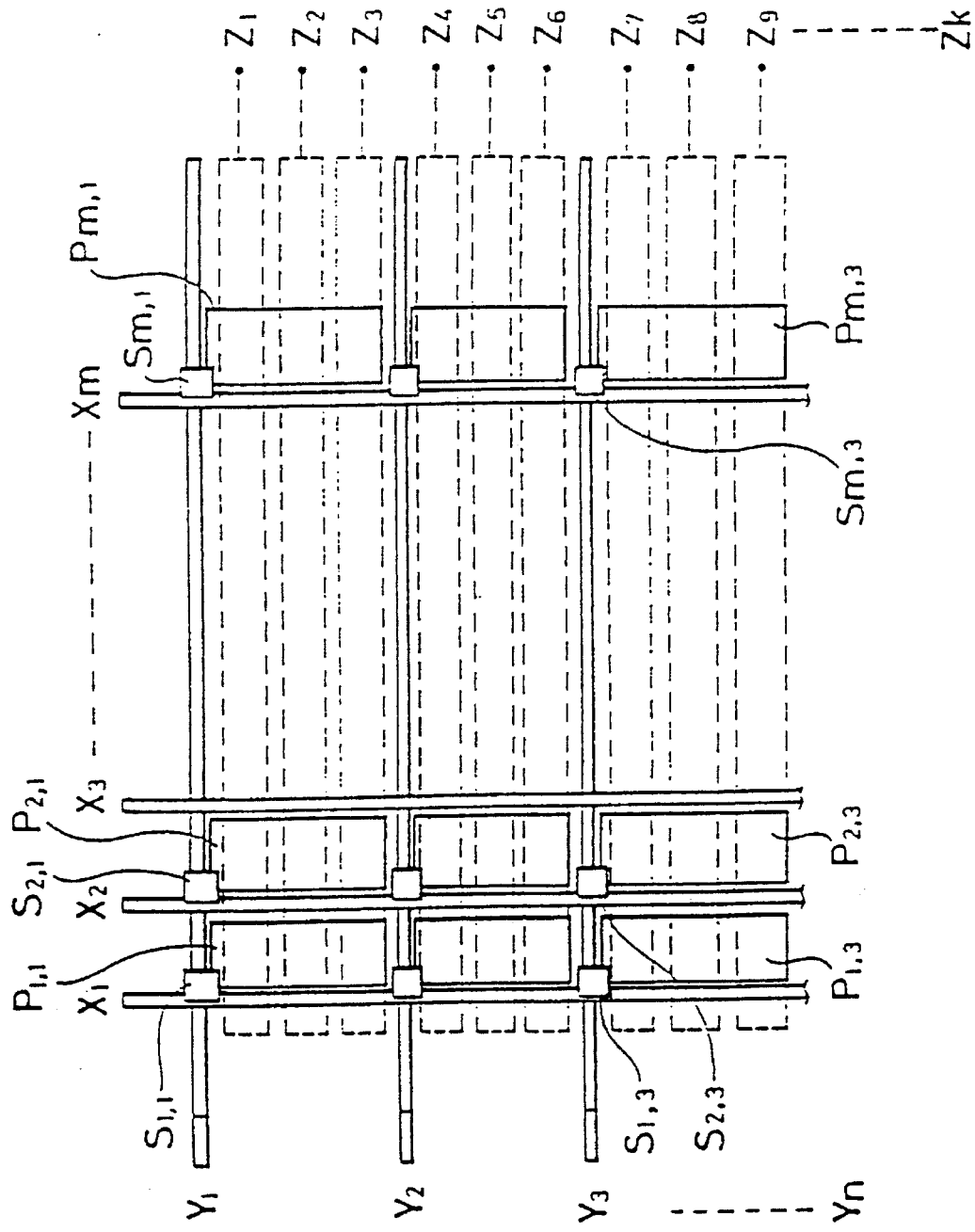
FIG. 15 is a plan view showing an optical address type simple-matrix liquid crystal display device according to the embodiment 6 of the present invention.

The optical address type display device according to the present invention may apply to the active-matrix driving type liquid crystal display device and a simple-matrix driving type liquid crystal display device proposed in the Japanese Patent Application No. Hei 3-258110 filed by the same applicant as the present application. FIG. 15 shows an arrangement of the liquid crystal display according to the embodiment 6.

On the basic substrate, a plurality of light waveguides $Y_1, Y_2, \ldots, Y_n$ are ranged in parallel in the Y direction. On the light waveguides $Y_1, Y_2, \ldots, Y_n$, a plurality of signal wires $X_1, X_2, \ldots, X_m$ are ranged in the X direction in a manner to be crossed with the light waveguides $Y_1, Y_2, \ldots, Y_n$. Pixel electrodes $P_{1,1}$ to $P_{m,n}$ are provided at the areas crossed between the adjacent light waveguides $Y_1, Y_2, \ldots, Y_n$ and the signal wires $X_1, X_2, \ldots, X_m$, respectively. At each of the crossed portions between the light waveguides $Y_1, Y_2, \ldots, Y_n$ and the signal wires $X_1, X_2, \ldots, X_m$, each of the light switching elements $S_{1,1}$ to $S_{m,n}$ his provided so that the corresponding one of the pixel electrodes $P_{1,1}$ to $P_{m,n}$ may be electrically connected with the corresponding one of the signal wires $X_1, X_2, \ldots, X_m$. In this figure, the luminous element array and the micro lens array are not shown. Inside of the opposed substrate, in the crossing direction with the signal wires $X_1, X_2, \ldots, X_m$ and between the adjacent ones of the light waveguides $Y_1, Y_2, \ldots, Y_n$, combinations of three of the linear transparent electrode wires $Z_1, Z_2, \ldots, Z_k$ are ranged in parallel. Also in this embodiment, like the embodiment 1 or 2, a groove for picking up light is provided at the location where each of the light switching elements $S_{1,1}$ to $S_{m,n}$ for the light waveguides $Y_1, Y_2, \ldots, Y_n$ is formed. Or, the material may be selected to meet the relation referred in the embodiment 4 among the indexes of refractions of the light waveguides $Y_1, Y_2, \ldots, Y_n$, the pixel electrodes $P_{1,1}$ to $P_{m,n}$, and the light switching elements $S_{1,1}$ to $S_{m,n}$. This is for guiding the light signal to the light switching element so that the light switching element may operate.

The liquid crystal display device described above operates as follows. The operation of the light switching elements $S_{1,1}$ to $S_{m,n}$ is the same as that of the light switching elements included in the active-matrix driving type liquid crystal display device indicated in the embodiment 1. The signal wires $X_1, X_2, \ldots, X_m$ may be electrically conducted with or insulated from the pixel electrodes $P_{1,1}$ to $P_{m,n}$ according to the bright/dark of the light-applied state for performing a switching operation. A light scan signal is transmitted to the light waveguides $Y_1, Y_2, \ldots, Y_n$ in sequence so that the signal wires $X_1, X_2, \ldots, X_m$ may be electrically conducted with the pixel electrodes $P_{1,1}$ to $P_{m,n}$ in sequence. At a time, by driving the transparent electrode wires $Z_1, Z_2, \ldots Z_k$ in sequence, a simple multiplexing drive can be done between the pixel electrodes $P_{1,1}$ to $P_{m,n}$ and the combination of each three transparent electrode wires opposed to the corresponding pixel electrode. That is, the display area composed of each three striped transparent electrodes (scan electrode) is assumed as one unit block and each block is selected by the light waveguides $Y_1, Y_2, \ldots, Y_n$. As a result, as keeping a duty ratio constant, the number of the scan lines is allowed to be tripled. In general, assuming that the number of the light waveguides is N and the number of transparent electrodes (scan line) per one light waveguide is M, N×M scan lines can be driven at a duty ratio of 1/M.

As a photoconductive material for the light switching element, in addition to a-Si:H, for example, hydrogenated amorphous silicon germanium (a-SiGe$_x$:H) may be used against a ray of light having a near red infrared wavelength. The thin film of a-SiGe$_x$:H may be formed by means of the plasma CVD technique using $SiH_4$ gas and $GeH_4$ gas.

Further, the LD or LED arranged to apply a ray of light having a near infrared wavelength (800 nm to 1000 nm band) has been developed for optical communication and thus is relatively inexpensive. The high-output LD or LED has been also developed. In the cause of using these light sources for applying a light scan signal, it is desirous to compose the light switching element made of a-SiGe$_x$:H having a high sensitivity against a ray of light having a near infrared wavelength. Considering a sensitivity characteristic against the wavelength of the used light, it is also possible to use materials of a-SiC$_x$:H, a-SiN$_x$:H, a-SiO$_x$:H, a-SiSn$_x$:H, and a-SiO$_x$N$_y$ as a photoconductive material. The light switching element may take a diode structure (for example, pin type, a Schottky type or MIS (Metal-Insulator-Semiconductor) type) of a photoconductive semiconductor, a back-to-back structure having two diodes series-connected in reverse or a diode ring structure having two diodes parallel-connected in reverse. As a light waveguide, any type of waveguide may be used if it meets the condition about light guiding performance and manufacturing process, such as ion-diffused glass waveguide, a quartz system waveguide formed by the flame deposition technique or the CVD technique, a waveguide made of a polymer material, a quartz fiber, or a plastic fiber. If the fiber is used, in place of the clad layer indicated in this embodiment, the clad provided in the fiber itself may be used.

The liquid crystal display device uses a TN (Twisted Nematic) mode and is made of a fluorine system liquid crystal ZLI4792 manufactured by the MERCK company. As a liquid crystal display mode for the nematic liquid crystal, a guest host mode, a STN (Super Twisted Nematic) mode or a phase transition mode may be used. Further, it may be possible to use a SSFLC (Surface Stabilized Ferroelectric Liquid Crystal) mode used for chiral smectic liquid crystal or a PDLC (Polymer Dispersed Liquid Crystal) made of a compound film consisting of polymer and liquid crystal.

In particular, the structure of the transmission type liquid crystal display device belonging to the optical address type liquid crystal display device may be effective as a reflective type liquid crystal display device if a reflective material may be use for a pixel electrode or a metal film. Further, a color filter is added inside of a panel for implementing the color display.

Further, the description has been expanded on the liquid crystal display device (LCD: Liquid Crystal Display) using liquid crystal as a display medium. The similar effect can be obtained by the display device using another display medium such as an electrochromic Display (ECD) or an Electrophoretic Display Device (EPD).

EMBODIMENT 7

The description will be oriented to an embodiment of the present invention as referring to the drawings.

Figure 16:
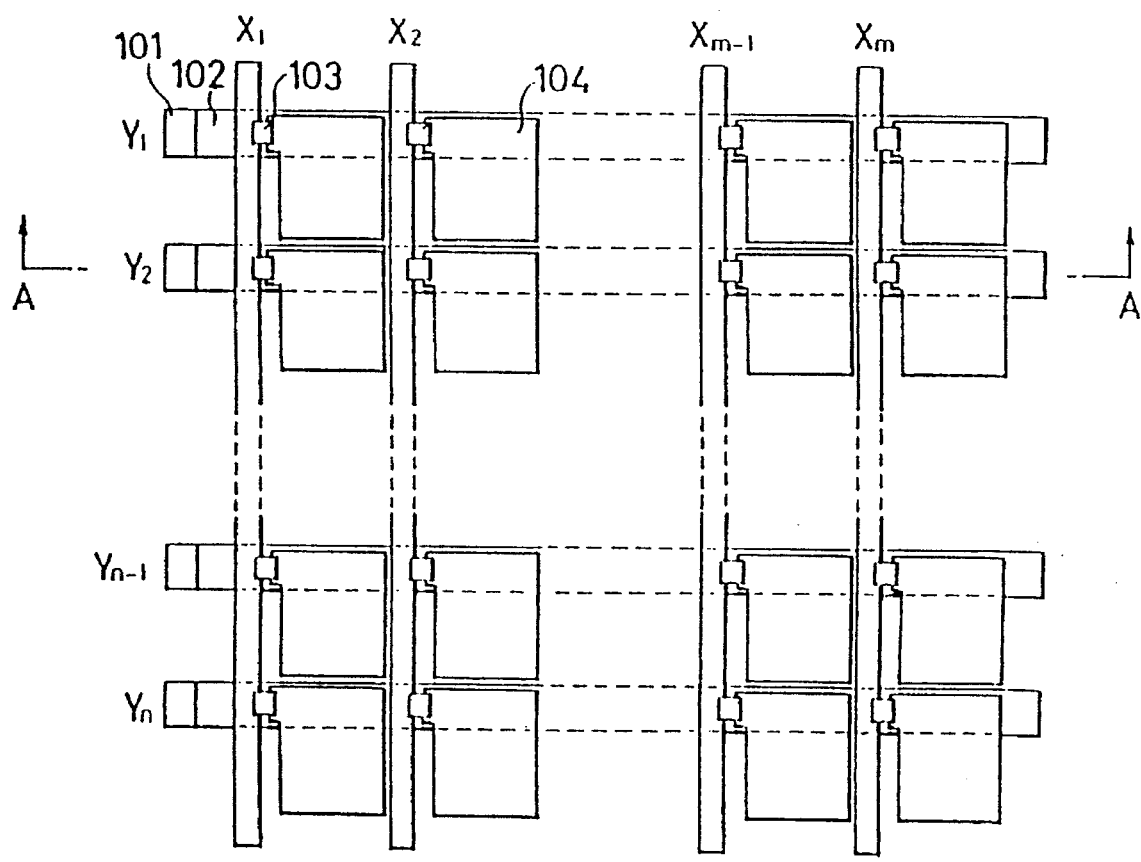
FIG. 16 is a plan view showing an optical scan type active-matrix driving liquid crystal display device according to the present invention.
Figure 17:
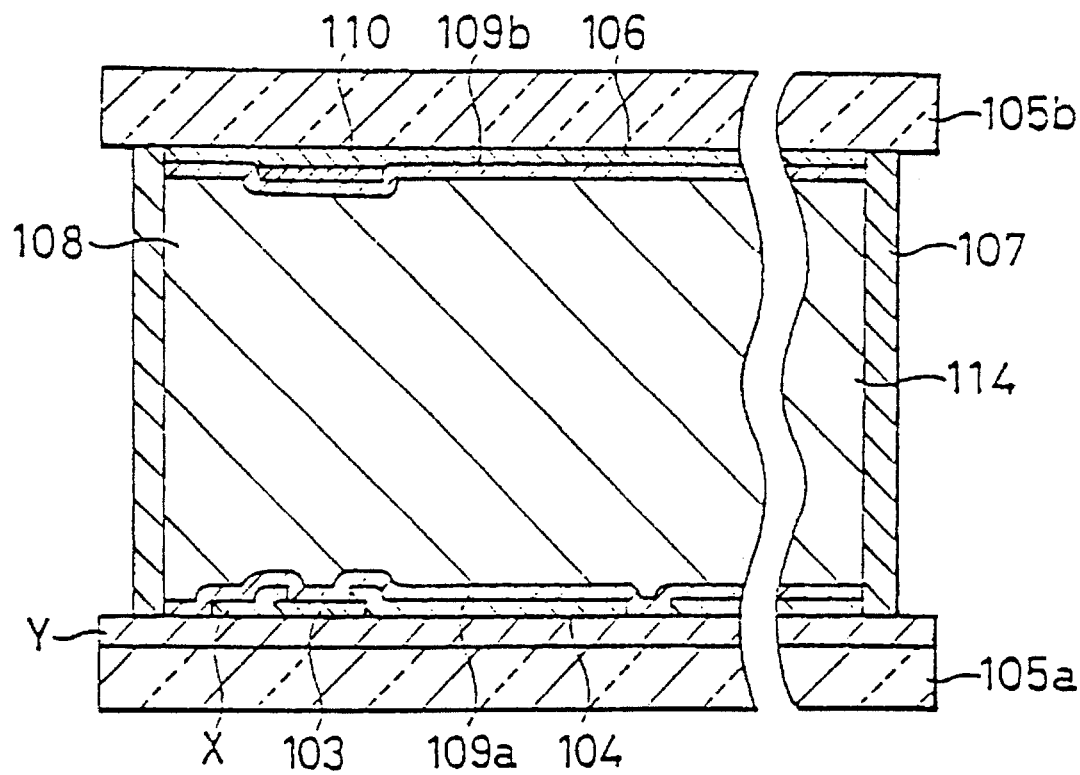
FIG. 17 is a section cut on the A—A line of FIG. 16.
Figure 18:
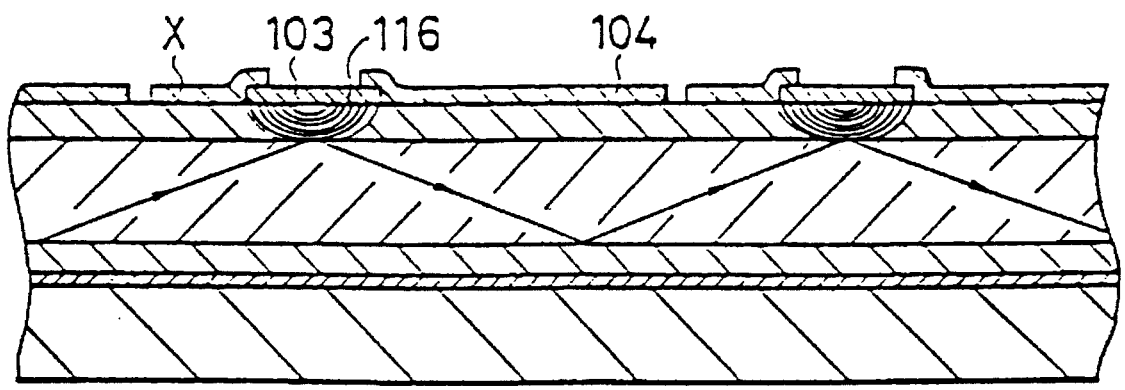
FIG. 18 is a principle view showing a structure of a light waveguide and a method for picking up light shown in FIG. 17.
Figure 19:
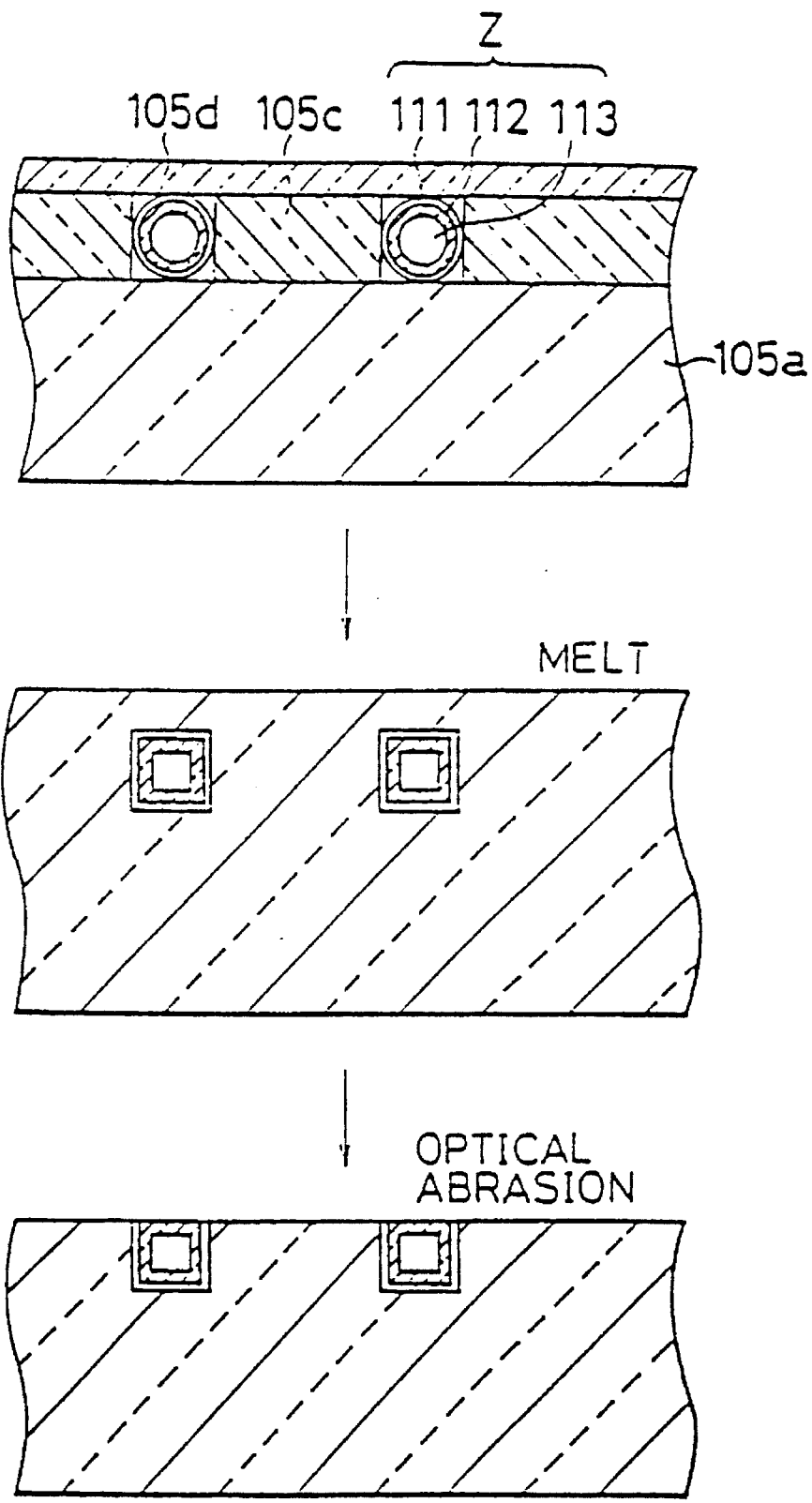
FIG. 19 is a view showing a manufacturing process for a method for picking up light in an optical scan type LCD according to the present invention.
Figure 20:
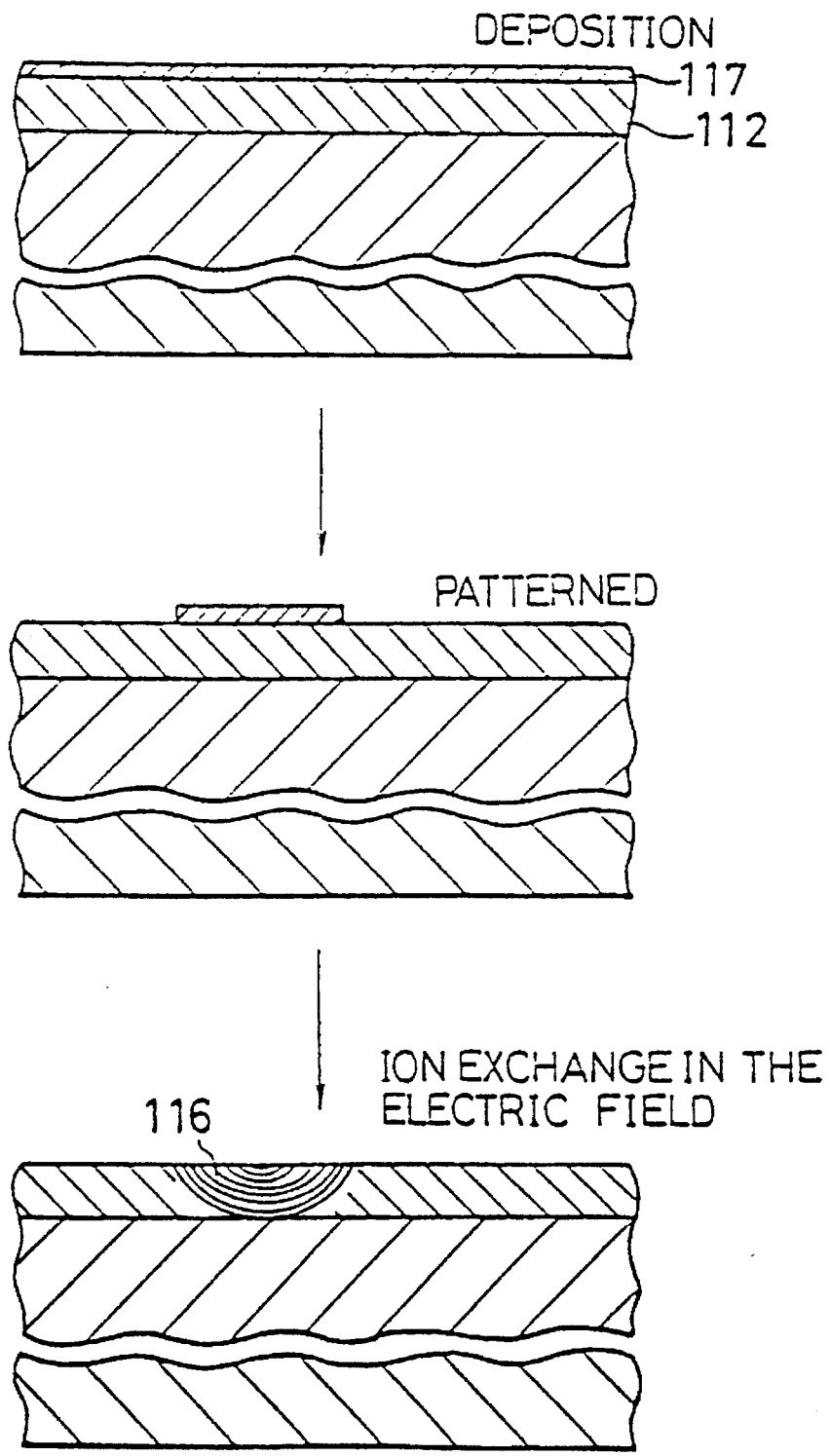
FIG. 20 is a view showing a process for an ion exchanging method which is one kind of a method for picking up light in the optical scan type LCD according to the present invention.

FIG. 16 is a plan view showing a basic structure of an optical address type driving LCD according to the embodiment 7 FIG. 17 is a section showing a basic structure of an optical address type driving LCD according to the embodiment 7. FIG. 17 is a section cut on the A—A line of FIG. 16. FIG. 18 shows the detailed structure and principle of a light waveguide shown in FIG. 17. FIG. 19 shows a process for manufacturing a light waveguide. FIG. 20 is a process for creating a light pick-up portion through the effect of an ion exchange method.

In the plan view shown in FIG. 16, a glass substrate 105$b$, a transparent electrode 106, a liquid crystal layer 108, and a seal 107 are not shown though they are shown on the section of FIG. 17.

As shown in FIGS. 16 and 17, on one glass substrate 105$a$, a plurality of linear luminous sources $Y_1, Y_2, \ldots, Y_{n-1}, Y_n$ are ranged in the Y direction from $Y_1$ to $Y_n$. On these linear luminous sources, a plurality of linear electrodes $X_1, X_2, \ldots, X_{m-1}, X_m$ are ranged in the X direction and in a manner to be crossed with the linear luminous sources, respectively.

Each of the linear luminous sources $Y_1, Y_2, \ldots, Y_{n-1}, Y_n$, for example, the linear luminous source $Y_2$ is composed of a luminous portion 101 formed of an LD or an LED array element and a linear waveguide 102 for transmitting a ray of light from the luminous portion 101, and a light pick-up portion 116 formed on the linear light waveguide 102. By operating the luminous portion 101, the light is propagated to the linear luminous source $Y_2$. At each of the crosspoints between the linear luminous sources $Y_1, Y_2, \ldots, Y_{n-1}, Y_n$ and the electrodes $X_1, X_2, \ldots, X_{m-1}, X_m$, a light pick-up portion 116 is formed by giving a high index of refraction to the clad layer. For example, the light propagated through the linear luminous source $Y_2$ is guided to the photoconductive layer 103.

The light switching element 103 made of a photoconductive layer is provided adjacent to each of the crosspoints between the linear luminous sources $Y_1, Y_2, \ldots, Y_{n-1}, Y_n$ and the electrodes $X_1, X_2, \ldots, X_{m-1}, X_m$. The electrodes $X_1, X_2, \ldots, X_{m-1}, X_m$ are formed on the same plane as the pixel electrode 104 for driving a display medium, that is, liquid crystal.

On the other glass substrate 105$b$, the transparent electrode 106 is formed. The liquid crystal layer 108 is sealed between the glass substrate and a sealing agent 107.

When a ray of light is applied to the light switching element 103, that is, the linear luminous source $Y_2$ is made operative, the light switching element 103 lowers its impedance so that the signal from the linear electrode $X_1$ may be applied to the pixel electrode 104, thereby changing an orientating state of liquid crystal.

The glass substrates 105$a$, 105$b$ are one embodiment of two substrates of the present invention. The light switching element 103 is an embodiment of a photoconductive layer of the present invention. The liquid crystal layer is an embodiment of a liquid crystal layer of the present invention. The linear luminous sources $Y_1, Y_2, \ldots, Y_{n-1}, Y_n$ are an embodiment of linear luminous sources of the present invention. The linear electrodes $X_1, X_2, \ldots, X_{m-1}, X_m$ are one embodiment of linear electrodes of the present invention.

By operating the linear luminous sources $Y_1, Y_2, \ldots, Y_{n-1}, Y_n$ sequentially from $Y_1$ to $Y_n$ for optical scan, the electric signal may be correspondingly applied to the linear electrodes $X_1, X_2, \ldots, X_{m-1}, X_m$. The picked ray of light guided from the linear luminous sources $Y_1, Y_2, \ldots, Y_{n-1}, Y_n$ serves to put the light switching element to an on state. The electric signals from the linear electrodes $X_1, X_2, \ldots, X_{m-1}, X_m$ are applied to the corresponding pixel electrodes 104. That is, in place of the TFT element electric gate signal, the light signals from the linear luminous sources $Y_1, Y_2, \ldots, Y_{n-1}, Y_n$ are used for scanning the light switching elements 103.

According to the foregoing embodiment, since the scan signal is light, no unfavorable state takes place where a scan (gate) signal is flown through the electric capacitance of the element like the TFT element. The rays of light from the linear luminous sources $Y_1, Y_2, \ldots, Y_{n-1}, Y_n$ are allowed to be efficiently guided to the light switching portion according to the distribution of indexes of refraction.

Later, the method for manufacturing the optical address type driving LCD in detail will be described.

The light waveguide 102 is formed as shown in FIG. 19 and the light pick-up portion 116 is formed as shown in FIG. 20.

At first, on the surface of the glass substrate 105$a$, a glass fiber Z (composed of a light cut-off layer 111, a clad 112, and a core 113) having a light cut-off layer 111 coated thereon and a glass plate 105$c$ made of the same material as the glass substrate 105$a$ are ranged alternately and then are molten with a glass plate 105$d$. To make the fiber appear on the surface, the glass 105$d$ is abraded for removal. Further, the light cut-off layer 111 of the fiber on the substrate and part of the clad 112 are removed by abrasion. At this time, there is left such an amount of the clad on the substrate as inhibiting to leak the light propagated inside of the light waveguide to the surface (the amount is variable according to the index of refractions of the core and the clad. For example, 1 μm or more). Next, ions are diffused on the fiber surface in a manner to match to the light switching portions for giving a high index of refraction to the part of the fiber surface. This part of the fiber surface serves as the light pick-up portion 116 for guiding the light being propagated through the core to the photoconductive layer 103. Concretely, at first, silver (Ag) 117 is formed as a thickness of 10 nm to 500 nm, preferably, 100 nm to 200 nm by the sputtering technique. The silver film is patterned according to the light switching portions. Then, the silver ion (Ag+) is exchanged with sodium ion (Na+) in the fiber under the voltage of 50 V. To diffuse ions Ag+, the film is heated to thermally diffuse the ions. For example, an Ag film having a thickness of 20 nm is evaporated and an ion exchanging portion 116 having a thickness of 10 μm is formed for about 20 minutes at the voltage of an electric field of 30 V/mm and at the temperature of 220° C. Further, the thermal diffusion of Ag+ is executed for two hours and at 370° C. These processes result in forming a portion with a high index of refraction having a thickness of about 30 μm. In place of Ag+, Tl+ may be used as ions to be exchanged. Though the method for exchanging dry ions for evaporating the Ag film, molten salts such as $AgNO_3$ (melting point 208° C.) and $TlNO_3$ (melting point 230° C.) may be used. A kind of metal such as titanium (Ti) may be patterned in advance so as to use it as a mask and the ion exchange in the electric field may be carried out in each molten salt. The diameter of the fiber may be set as 20 to 500 μm, preferably, 50 to 100 μm in a manner to match to the size of the photoconductor. The width of the glass 105c may be set as 50 to 500 μm, preferably, 200 to 300 μm in a manner to match to the size of a pixel.

At each of the crosspoints between the linear luminous sources $Y_1, Y_2, \ldots, Y_{n-1}, Y_n$ and the linear electrodes $X_1, X_2, \ldots, X_{m-1}, X_m$, that is, on the light pick-up portion 116, the photoconductive layer 103 is formed. This photoconductive layer 103 is formed by forming a hydrogenated amorphous silicon (a-Si:H) film by means of a plasma chemical vapor deposition (P-CVD) technique and patterning the film by means of an etching technique. As this photoconductive layer 103, in place of a-Si:H, it is possible to use hydrogenated amorphous silicon germanium (a-SiGe:H), hydrogenated amorphous silicon carbide (a-SiC:H), hydrogenated amorphous silicon oxide (a-SiO:H), and hydrogenated amorphous silicon nitride (a-SiN:H) according to the wavelength of the ray of light emitted from the luminous source 101.

Then, the linear electrodes $X_1, X_2, \ldots, X_{m-1}, X_m$ are formed by forming metal such as Al by means of the sputtering technique and patterning the metal by the etching technique. As the linear electrode, in place to Al, it is possible to use metal such as Mo, Cr and Ti or a transparent electrode made of indium-tin oxide (ITO).

On the other hand, the pixel electrode 104 is formed by depositing the ITO film by means of the sputtering technique and patterning it by means of the etching technique.

In this embodiment, the linear electrode X and the pixel electrode 104 are formed on the photoconductive layer 103. Conversely, the photoconductive layer 103 may be formed on the linear electrode X and the pixel electrode 104. The structure composed of the linear electrode X, the photoconductive layer 103, and the pixel electrode 104 takes a planar type but it may take a sandwiched type.

On these layers, an orientation layer 109a is formed. The orientation layer 109a may be formed by forming a polyimide film by a spinner and rubbing the polyimide film. In place of the spinner, a printing method may be used for forming the orientation layer 109a.

On the other glass substrate 105b, a transparent electrode 106 may be formed. This transparent electrode 106 may be formed by depositing ITO by means of the sputtering technique.

On the transparent electrode 106, a light cut-off layer 110 is formed in a manner to match to the patterns of the light switching element composed of the photoconductive layer 103 formed on the opposed substrate. This light cut-off layer 110 is formed of Al with the sputtering technique and etching the Al film. As the light cut-off layer 110, in place of Al, a metal such as Mo, Cr, or Ti, an organic pigment dispersed resin and an inorganic pigment dispersed resin may be used. Though the layer 110 is formed on the transparent electrode 106 herein, it may be formed on the rear side of the glass substrate 105b.

Further, the orientation layer 109b is formed on these layers. This orientation layer 109b is formed by rubbing the polyimide film formed by a spinner. Though the orientation layer 109b is formed with a spinner, the printing method may be used for forming it.

Between the substrates each having the layers formed as described above, a spacer (not shown) is dispersed. Then, both of the substrates are pasted with each other with a sealing agent 107.

The liquid crystal layer 108 is formed by injecting liquid crystal between the substrates. The thickness of the liquid crystal layer 108 is about 5 μm. The display mode is a twisted nematic normally white type. As a liquid crystal material, the liquid crystal layer 108 is formed by injecting in vacuum PCH liquid crystal ZLI-1565 manufactured by the MELK company.

When a ray of light is applied to the light switching element 103, that is, the linear luminous source $Y_2$ is made operative, the light switching element 103 lowers its impedance so that the signal from the linear electrode $X_1$ may be applied to the pixel electrode 104, thereby changing the orientating state of the liquid crystal.

EMBODIMENT 8

Figure 21:
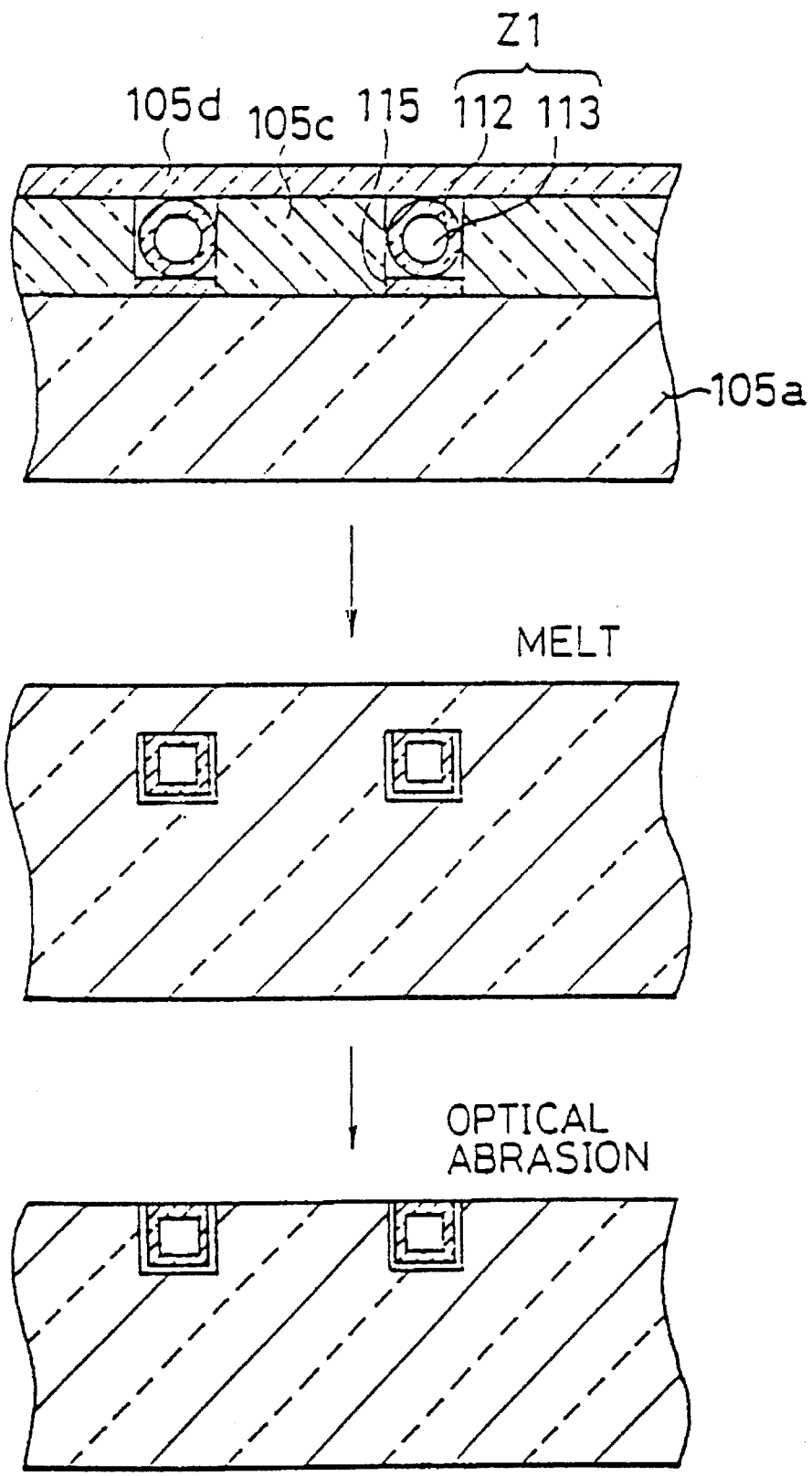
FIG. 21 is a view showing another manufacturing process for a light waveguide included in the optical scan type LCD according to the present invention.

FIG. 21 shows a method for producing a light waveguide according to another embodiment of the invention.

Like the embodiment 7, a glass fiber Z1 (composed of a clad 112 and a core 113) and a glass plate 105c made of the same material as the glass substrate 105a are alternately ranged on the glass substrate 105a. A preform of a glass paste is laid between the glass fiber Z1 and the glass substrate 105a so that a glass 105d may be put on and molten with them. The glass paste 115 is produced according to the characteristics (thermal expansion coefficient, glass transition point, and the like) of the glass substrate 105a, the glass plate 105c and the glass fiber Z1. The glass transition point of the glass paste 115 is somewhat lowered than the glass substrate 105a, the glass plate 105c and the glass fiber Z1. Since the glass paste 115 is black, it may serve as the light cut-off layer. The glass 105d is abraded to make the fiber portion appear on the surface. Further, part of the clad 112 of the fiber on the surface of the substrate is abraded for removal. At this time, it is necessary to leave such an amount of the clad on the surface of the substrate as inhibiting to leak the light being propagated inside of the light waveguide. (The amount is variable according to the indexes of refraction of the core and the clad, for example, 1 μm or more). Then, ions are diffused on the surface of the fiber in a manner to match to the light switching portion so as to give the fiber surface a high index of refraction. The light pick-up portion 116 is formed for guiding the light being propagated in the core to the photoconductive layer 103. At first, a silver (Ag) film is formed on the fiber surface in a manner to have a thickness of 10 nm to 500 nm, preferably, 100 nm to 200 nm and the film is patterned according to the light switching portions. Then, under the voltage of 50° C., sodium ions (Na+) in the fiber are exchanged with the silver ions (Ag+). If Ag+ is further diffused, the film is heated for thermally diffusing Ag+ ions. The Ag+ film of 200 nm is deposited and the ion exchange portion having the thickness of 10 μm is formed for about 20 minutes and at the temperature of 220° C. and the electric field of 30 V/mm. Further, by thermally diffusing Ag+ ions at the temperature of 370° C. and for two hours, it is possible to form a portion with a high index of refraction having a thickness of about 30 μm. The Ag+ ions to be exchanged with the sodium ions may be replaced with Tl+ ions. The dry ion exchange method for depositing the Ag film is used. In place, molten salts such as $AgNO_3$ (melting point 208° C.) and $TlNO_3$ (melting point 230° C.) may be used. The patterned metal film of titanium (Ti) is prepared for a mask. The ions are exchanged in the electric field in each molten salt. The intensity of the electric field, the time and the temperature may be adjusted according to the desired thickness of diffusion. The diameter of the fiber Z1 may be set as 20 to 500 μm, preferably, 50 to 100 μm in a manner to match to the size of the photoconductor. The width of the glass paste 15 is according to the diameter of the fiber. The width of the glass 5c may be set as 50 to 500 μm, preferably, 200 to 300 μm according to the size of each pixel.

EMBODIMENT 9

Figure 22:
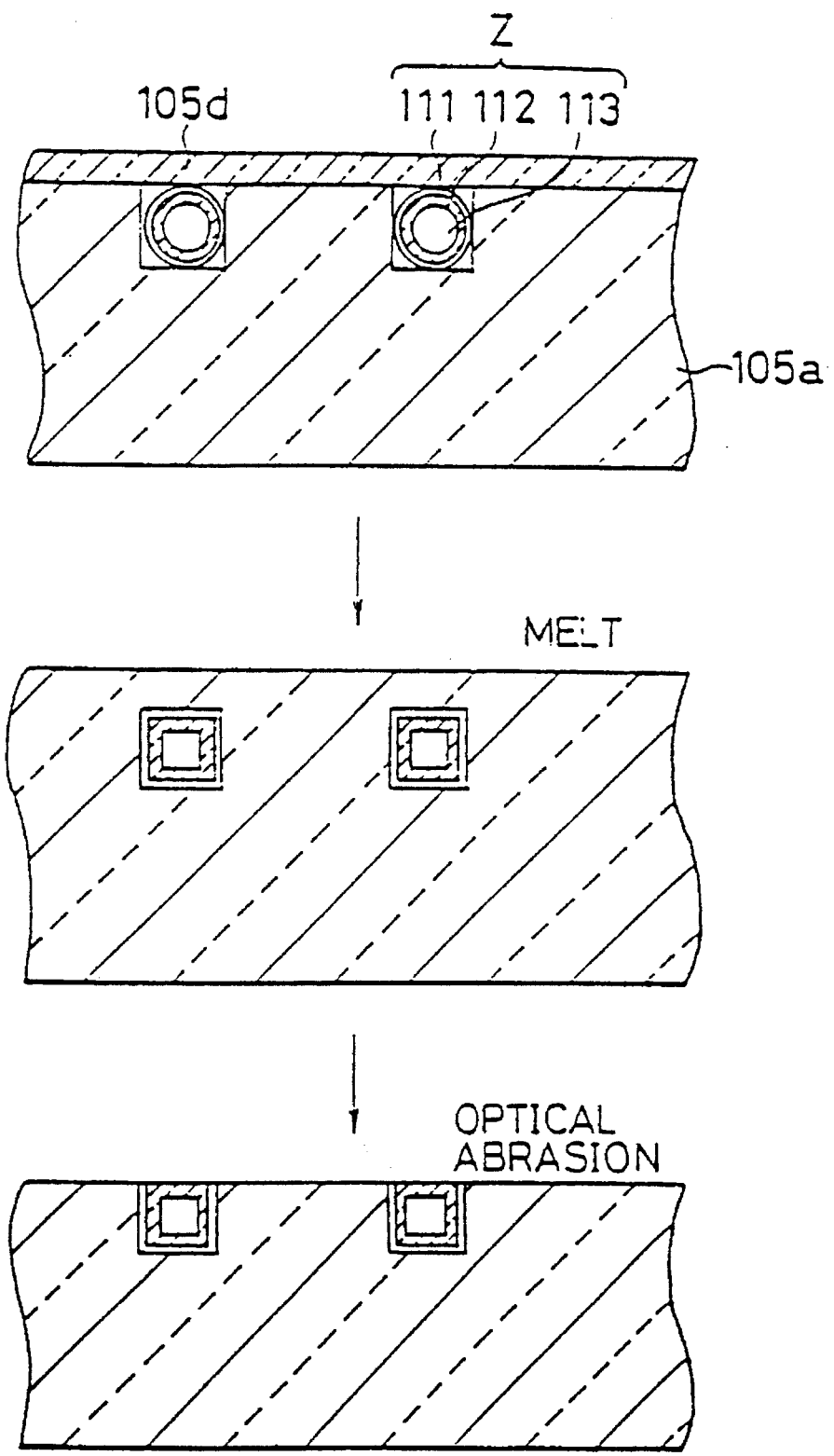
FIG. 22 is a view showing another manufacturing process for a light waveguide included in the optical scan type LCD according to the present invention.

FIG. 22 shows a method for producing a light waveguide according to another embodiment of the present invention.

On the glass substrate 105a, a patterned resist is formed. Then, a groove is formed by means of a sand-blast technique. A glass fiber Z (composed of a light cut-off layer 111, a clad 112 and a core 113) is fitted and molten in the groove. In FIG. 22, the sectional form of the groove is rectangular. In actual, it may be semicircular or V-formed. As a method for forming a groove on the glass substrate, for mechanical working, a blade may be used in place of the sand-blast technique. For chemical working, an etching technique may be used. Both of the mechanical working and the chemical working may be effective. Preferably, the mechanical working is performed and then the chemical working is performed. When melting the glass fiber Z, like the embodiment 7, a glass plate 105d may be put on the glass fiber and molten with it. In this case, the glass 105d is required to be removed by the abrasion after melting. The parts of the light cut-off layer 111 and the clad 112 of the fiber on the substrate surface are abraded for removal. It is necessary to lead such an amount of clad on the substrate surface as inhibiting to leak the light being propagated inside of the light waveguide. (The amount is variable according to the indexes of refraction of the core and the clad, for example, 1 μm or more). Next, ions are diffused on the fiber surface in a manner to match to the light switching portions for enhancing the indexes of refractions of the parts so that the light pick-up portion 116 may be formed for guiding the light being propagated in the core to the photoconductive layer 103. The silver (Ag) is formed on the fiber surface by means of the sputtering technique in a manner to have a thickness of 10 nm to 500 nm, preferably, 100 nm to 200 nm by the sputtering technique. The film is patterned according to the light switching portions. Then, the silver ions (Ag+) are exchanged with sodium ions (Na+) in the fiber under the voltage of 50 V. To diffuse Ag+ further, the film is heated for thermally diffusing the Ag+ ions. For example, an Ag film having a thickness of 200 nm is deposited. By thermally diffusing Ag+ ions for two hours and at the temperature of 370° C., a portion with a high index of refraction can be formed to have a thickness of about 30 μm. As ions to be exchanged with the sodium ions, the ions of Ag+ are used in this embodiment. In place, Tl+ ions may be used. At first, the dry ion exchange technique is used for depositing the Ag film. In place, molten salts such as $AgNO_3$ (melting point 208° C.) and $TlNO_3$ (melting point 230° C.) are used. The patterned metal film of titanium (Ti) is prepared as a mask. With the mask, the electric field ion exchange may be carried out in each molten salt. The intensity of an electric field, the time and the temperature may be adjusted to match to a desired thickness of diffusion. The diameter of the fiber Z may be set as 20 to 500 μm, preferably, 50 to 100 μm in a manner to suit to the size of the photoconductor. The width of the glass 105c may be set as 50 to 500 μm, preferably, 20 to 300 μm in a manner to suit to the size of each pixel.

EMBODIMENT 10

Figure 23:
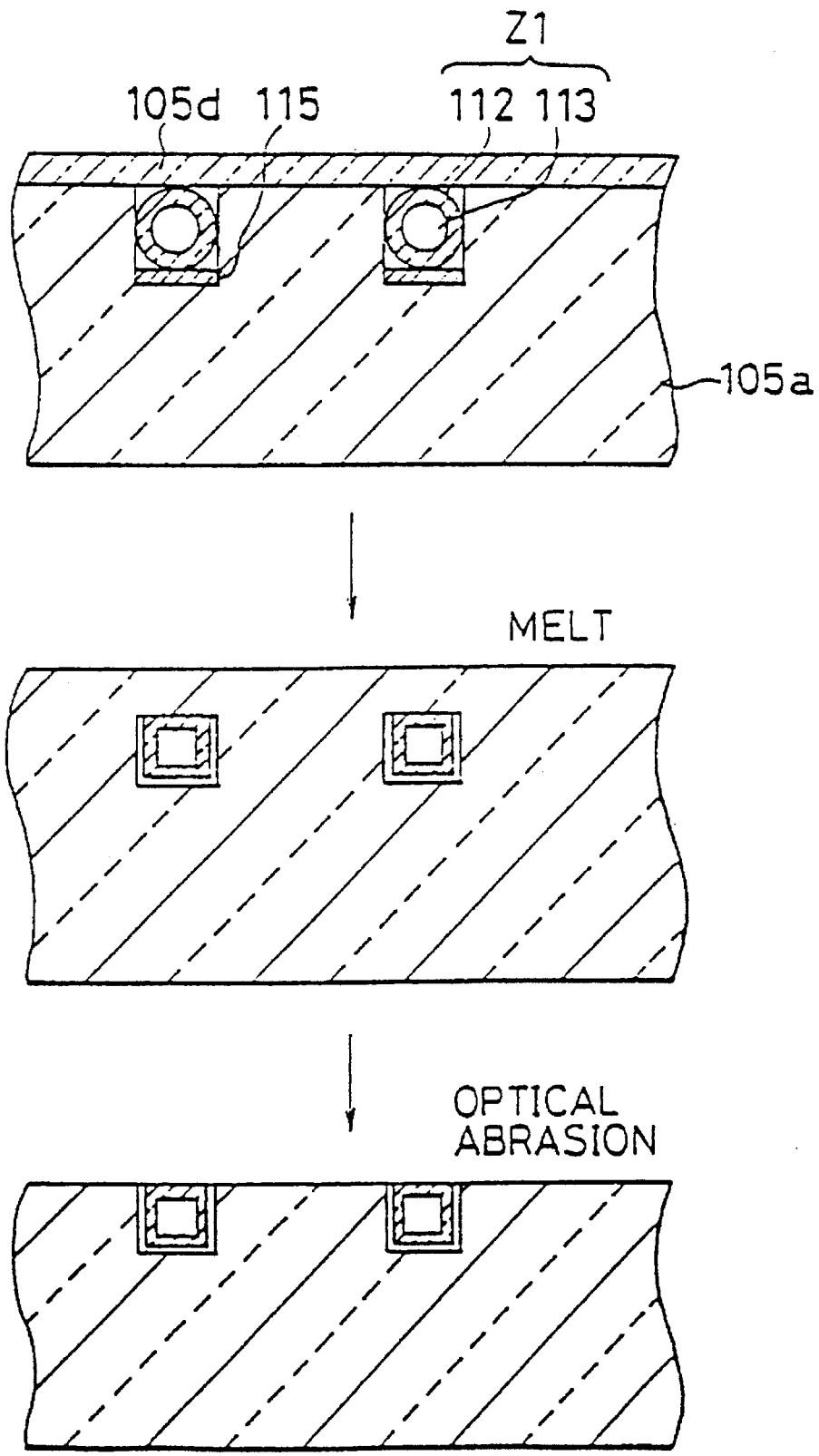
FIG. 23 is a view showing another manufacturing process for a light waveguide included in the optical scan type LCD according to the present invention.
Figure 24:
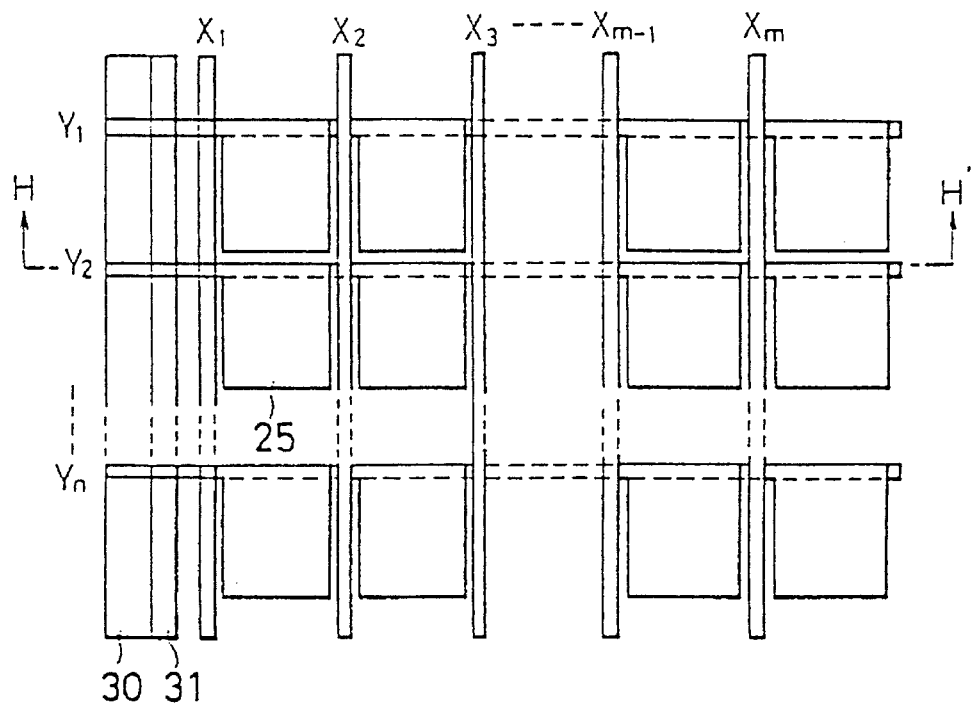
FIG. 24 is a view showing a conventional optical address type active-matrix liquid crystal display device filed by the applicant of the present application.
Figure 25:
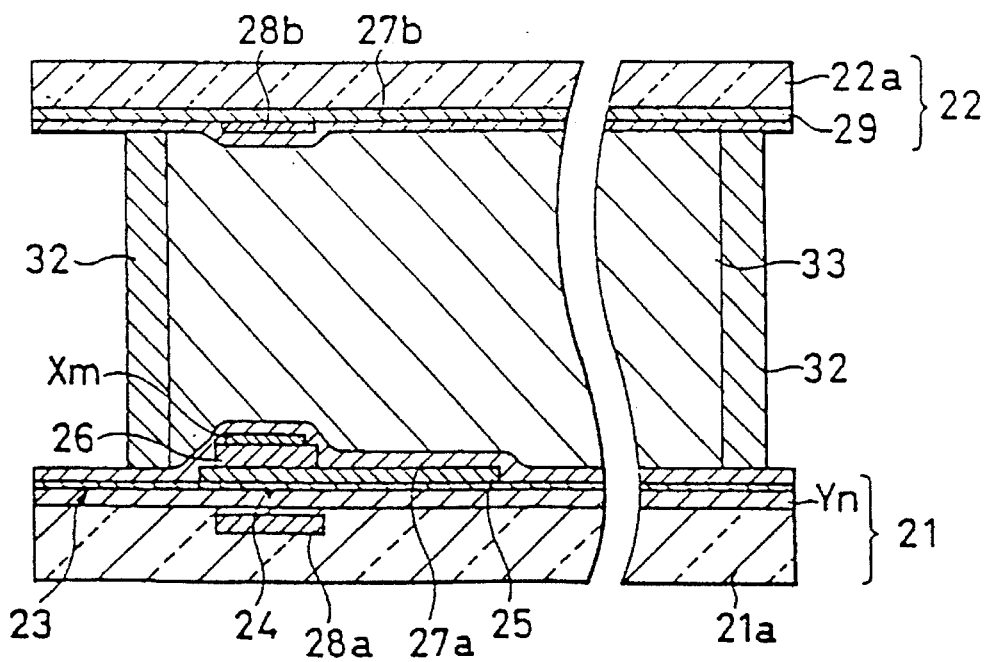
FIG. 25 is a view showing an element structure cut on the H–H' line of FIG. 24.
Figure 26:
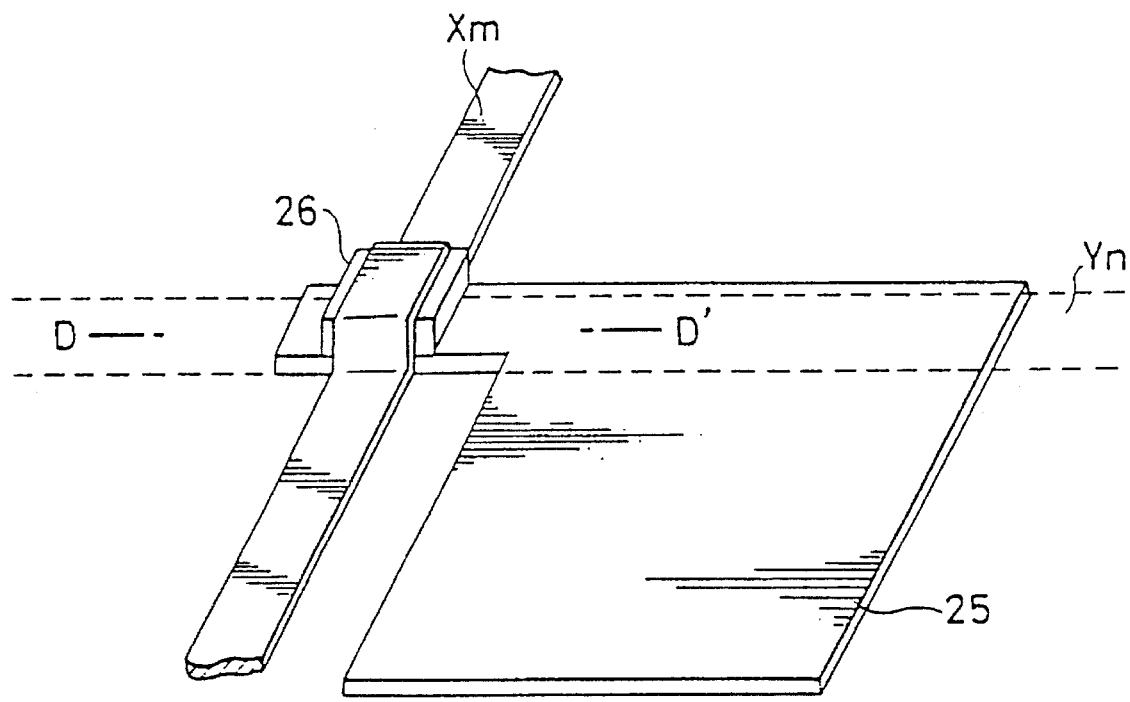
FIG. 26 is a perspective view showing a positional relation among a signal wire, a light switching element and a pixel electrode included in a conventional optical address type active-matrix liquid crystal display device filed by the applicant of the present application.
Figure 27:
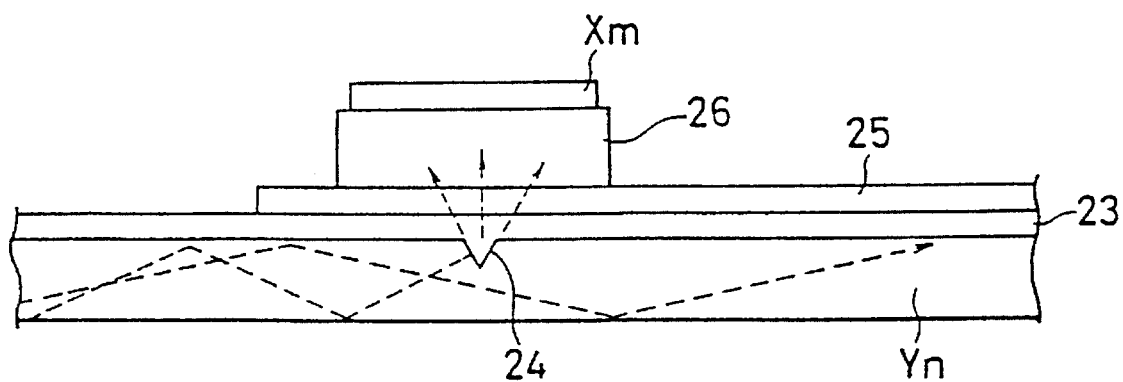
FIG. 27 is a view showing an element structure cut on the D–D' line of FIG. 24.
Figure 28:
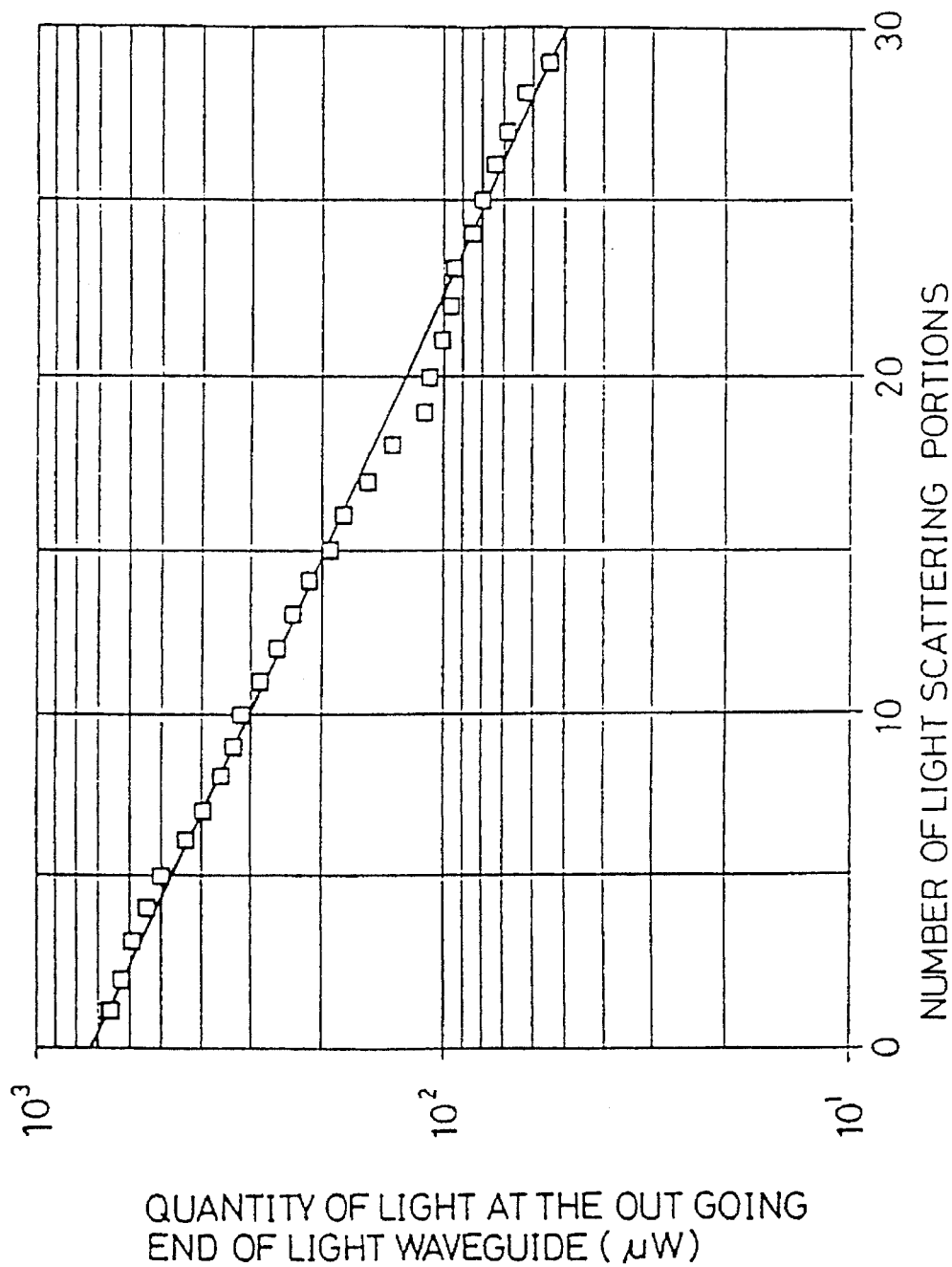
FIG. 28 is a view showing a relation between the quantity of light guided out of one end of the light waveguide when light is incident to the other end of the light waveguide and the number of light scattering portions on the light waveguide.
Figure 29:
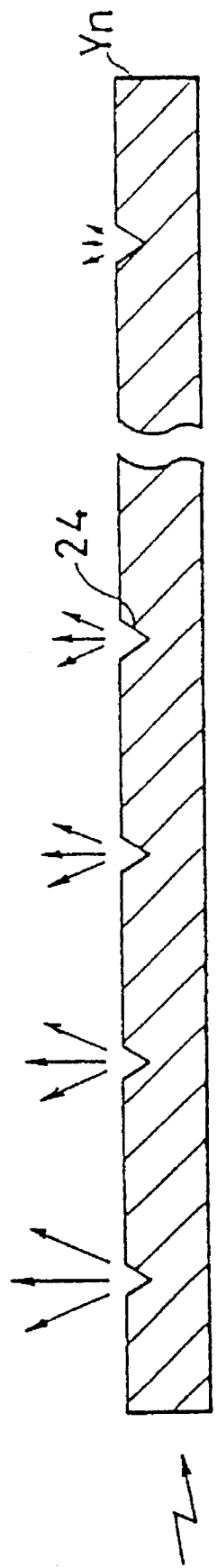
FIG. 29 is a sectional view showing a form of a light pick-up portion on the light waveguide according to the prior art.

FIG. 23 shows a method for producing a light waveguide according to another embodiment.

After forming a patterned resist on the glass substrate 105a, a groove is formed by means of the sand-blast technique. A preform 115 of the glass paste and the glass fiber (composed of the clad 112 and the core 113) are fitted to the groove in the describing sequence and are molten. The used glass paste 115 is produced according to the characteristics of the glass substrate 105a, the glass plate 105c and the glass fiber Z1 (thermal expandability, glass transition point, etc.). The glass transition point of the glass paste 115 is somewhat made lower than those of the glass substrate 105a, the glass plate 105c and the glass fiber Z1. Since the glass paste 115 is black, it serves as a light cut-off layer. In FIG. 23, the section of the groove is rectangular. In actual, however, it may be semicircular or V-formed. As a method for forming a groove on the glass substrate, for mechanical working, a blade may be used in place of the sand-blast technique indicated in the embodiment. For chemical working, the etching technique may be used. Both of the mechanical working and the chemical working may be effective. Preferably, the mechanical working and then the chemical working may be done in this order. In the case of melting it, like the embodiment 8, a glass plate 105d may be put before melting. The glass 105d is removed by abrasion after melting. Part of the clad 112 of the fiber on the substrate surface is removed by abrasion. Such an amount of the clad on the substrate surface as inhibiting to leak light being propagated inside of the light waveguide has to be left. (The amount is variable according to the indexes of refraction of the core and the clad.) Next, ions are diffused on the fiber surface in a manner to suit to the light switching portions so as to enhance the index of refraction of the fiber surface for forming the light pick-up portion 116 for guiding the light being propagated in the cores to the photoconductive layer 103. Silver (Ag) is formed on the fiber surface to have a thickness of 10 nm to 500 nm, preferably, 100 nm to 200 nm by means of the sputtering technique. The silver film is patterned according to the light switching portions. Then, the silver ions (Ag+) are exchanged with sodium ions (Na+) in the fiber at the voltage of 50 V. To diffuse the Ag+ ions further, the film is heated for thermally diffusing the Ag+ ions. For example, an Ag film having a thickness of 200 nm is deposited. The ion exchanging portion having a thickness of 10 μm is allowed to be formed at the temperature of 220° C. and an electric field of 30 V/mm and for about 20 minutes. Further, by thermally diffusing Ag+ ions at the temperature of 370° C. and for two hours, a portion with a high index of refraction having a thickness of about 30 μm can be formed. The ions to be exchanged are Ag+ ions. In place, Tl+ ions may be used. The dry ion exchange method is used for depositing an Ag film. In place, molten salts such as $AgNO_3$ (melting point 208° C.) and $TlNO_3$ (melting point 230° C.) may be used and the titanium metal patterned film is used as a mask. With the mask, the electric field ion exchange may be executed in each molten salt. The intensity of an electric field, the time and the temperature may be adjusted in a manner to suit to a desired diffusing thickness. The diameter of the fiber may be set as 20 to 500 μm, preferably, 50 to 100 μm in a manner to suit to the size of the photoconductor. The width of the glass paste is set according to the diameter of the fiber. The width of the glass 105c may be set as 50 to 500 μm, preferably, 200 to 300 μm in a manner to suit to the size of the pixel.

Many widely different embodiments of the present invention may be constructed without departing from the spirit and the scope of the invention. It should be understood that the present invention is not limited to the specific embodiments described in the specification, except as defined in the appended claims.

What is claimed is:

1. An optical address type display device comprising:

an insulated basic substrate;

a plurality of light waveguides arranged on said basic substrate in parallel;

a plurality of signal wires arranged in parallel and in a manner to be crossed with said light waveguides, respectively;

a plurality of photoconductive layers laid between said light waveguides and said signal wires at respective crosspoints between said light waveguides and said signal wires and for performing a switching operation in response to light sent from said light waveguides;

a plurality of pixel electrodes provided in a manner to contact with said photoconductive layers and said light waveguides;

an insulated opposed substrate located as opposed to said basic substrate with a display medium laid between said substrates and having an opposed electrode on the surface opposed to said basic substrate; and light pick-up grooves provided at the corresponding location to said photoconductive layers on said light waveguides and for guiding light transmitted through said light waveguides to said photoconductive layers, the size of each of said grooves being increased progressively along a transmission path of each of said light waveguide.

2. An optical address type display device as claimed in claim 1, wherein said light pick-up groove is a V-formed groove.

3. An optical address type display device as claimed in claim 1, wherein plural light pick-up grooves arranged along said light waveguide and adjacent to one another are divided into groups in each of which a size of each of said grooves is identical with one another.

4. An optical address type display device as claimed in claim 3, wherein number of the groups with different groove sizes is 2 or more and 0.1 n or less for n light pick-up grooves provided on one light waveguide.

5. An optical address type display device comprising:

an insulated basic substrate;

a plurality of light waveguides arranged on said basic substrate in parallel to each other;

a plurality of signal wires arranged in parallel and in a manner to be crossed with said light waveguides, respectively;

a plurality of photoconductive layers laid between said light waveguides and said signal wires and directly connected with each light guiding portion of said light waveguides at respective crosspoints between said light waveguides and said signal electrodes and for performing a switching operation in response to a light signal from said light guiding portion;

a plurality of pixel electrodes provided to be connected with said photoconductive layers, respectively; and an insulated opposed substrate located in opposition to said basic substrate with a display medium therebetween and having an opposed electrode on the surface opposed to the basic substrate;

wherein a middle layer is provided on the interface between said light guiding portion and said photoconductive layer, and the relation among an index of refraction $n_1$ of said light waveguide, an index of refraction $n_2$ of photoconductive layer, an index of refraction $n_3$ of said middle layer, and a range of angles of incidence $\theta_1$ passed from said light guiding portion to said middle layer meets the following expression (2) of $$n_1 \sin \theta_1 < n_2 \text{ and } n_1 \sin \theta_1 < n_3 \qquad (2)$$

and an area of the interface between said light guiding portion and said middle layer is increased progressively along an optical transmission path of said light guiding portion.

6. An optical address type display device as claim 1, wherein said display medium is made of liquid crystal.

* * * * *